US006937612B1

(12) United States Patent
Mauger et al.

(10) Patent No.: US 6,937,612 B1
(45) Date of Patent: Aug. 30, 2005

(54) COMMUNICATIONS METHOD AND APPARATUS

(75) Inventors: Roy Harold Mauger, Radlett (GB); Desne Jean Rose, St Albans (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/222,019

(22) Filed: Dec. 31, 1998

(30) Foreign Application Priority Data

Jul. 3, 1998 (GB) ............................................ 9814412

(51) Int. Cl.[7] ................................................... H04J 3/22
(52) U.S. Cl. ....................................... 370/465; 370/522
(58) Field of Search ................................ 370/261, 465, 370/469, 395.52, 356, 391, 474, 352, 524, 354, 401, 467, 522, 410, 353, 400, 389, 397

(56) References Cited

U.S. PATENT DOCUMENTS

| | | | | | |
|---|---|---|---|---|---|
| 5,528,590 | A | * | 6/1996 | Iidaka et al. | 370/395.65 |
| 5,610,910 | A | * | 3/1997 | Focsaneanu et al. | 370/351 |
| 5,991,292 | A | * | 11/1999 | Focsaneanu et al. | 370/352 |
| 6,028,838 | A | * | 2/2000 | Yamamura et al. | 370/229 |
| 6,163,531 | A | * | 12/2000 | Kumar | 370/260 |
| 6,222,843 | B1 | * | 4/2001 | Mauger | 370/467 |
| 6,345,047 | B1 | * | 2/2002 | Regnier | 370/352 |
| 6,463,053 | B1 | * | 10/2002 | Chen | 370/352 |

FOREIGN PATENT DOCUMENTS

| | | |
|---|---|---|
| CA | WO 98/58517 | * 12/1998 |
| EP | 0 560 706 | 9/1993 |
| EP | 0 758 824 | 2/1997 |
| GB | 2 326 317 | 12/1998 |
| WO | WO 96/22645 | 7/1996 |

OTHER PUBLICATIONS

Greene, Nancy, M.*

* cited by examiner

*Primary Examiner*—Chi Pham
*Assistant Examiner*—Alexander O. Boakye
(74) *Attorney, Agent, or Firm*—Barnes & Thornburg

(57) ABSTRACT

A method for enabling traffic to be carried between devices which may use different communications protocols employs a multimedia service provide, which provides an interface between two devices or between a device and a multimedia network. The service provider enables conversion between the communications protocols used by the two devices by comparing the protocols used by each device and, preferably, carrying out a conversion which minimises the amount of traffic conversion required. If two devices are interfaced to an intermediate network via respective service providers, the service providers preferably negotiate before communication between the devices begins to ensure, if possible, that traffic conversion is only performed by one of the service providers. Each device is connected to the service provider at a network access server of a type matched to the device type and traffic conversion is carried out as required using an Asynchronous Transfer Mode Virtual Channel switch controlled by a multimedia server.

30 Claims, 18 Drawing Sheets

COMMUNICATIONS METHOD AND APPARATUS

BACKGROUND OF THE INVENTION

The invention relates to a communications method and apparatus for carrying communications traffic between devices, and in particular for carrying multimedia communications traffic between user devices. The invention is particularly, though not exclusively, applicable to virtual-circuit switched systems, such as asynchronous transfer mode (ATM) networks.

Telephony systems have evolved from simplistic hard-wired interconnected networks to broadband, high capacity systems that support multimedia, multi-mode communication devices on local area networks (LIANs) and packet-switched communication systems. Indeed, instead of having to rely entirely on dedicated land-line infrastructure, present day technologies now occupy virtual-channel environments in both the radio frequency and land-line domains.

The designers of today's narrowband communication systems, which typically employ pulse code modulation at a data rate of 64 kilo-bits per second (kbps), are presently considering the adaptation and development of these narrowband communication systems to support a migration to a multimedia environment having data rates of 2 Mega-bits per second (Mbps) or more. As will be understood, the requirement for migration arises as a direct consequence for the vast costs involved in deploying global communication systems, with ATM being touted as providing a low cost and simple package that is capable of supporting migration from narrowband (or wide-band) to broadband applications (principally in the intervening period before the full deployment of a free-standing Universal Mobile Telecommunication System (UMTS), for example).

It has also been necessary for designers to consider and anticipate the extensive and elaborate requirements for future control signalling and call management techniques. In this respect, new signalling schemes, such as AAL-2 negotiation procedures, have been developed to provide robust, high bandwidth communications at high data rates, while designers have also been keen to define system architectures in terms of "stacks" that comprise discrete layers of infrastructure or signalling protocols that each add functionality, capacity or control over a preceding layer in the stack.

The problems faced by system designers are further exacerbated by the fact that, to date, the various different forms of communication system, e.g. ATM, LANs and cellular radiotelephone schemes, operate distinct signalling and transport protocols that are incompatible on a network-to-network basis.

It is therefore clearly desirable to design and produce a communications systems architecture that supports varying types of present-day communications devices, and has the capability to interconnect different types of device which may use different signalling and transport protocols and to interconnect narrowband, wideband and broadband networks and other devices.

SUMMARY OF THE INVENTION

The invention provides, in its various aspects, a communications method, apparatus and system as defined in the appended independent claims. Preferred or advantageous features of the invention are defined in dependent subclaims.

The invention thus provides in a first aspect a method for carrying traffic between two devices which may be of different types, in that they use different formats, standards or protocols for communication.

Conventionally, in order to transfer information, or traffic, between two devices of different types it has been necessary to pass the traffic through a corresponding, dedicated gateway capable of carrying out the necessary conversion of the traffic format, standard or protocol. Any particular dedicated gateway conventionally only converts traffic between specific device types. Conversion of traffic between a different pair of device types conventionally requires a different dedicated gateway.

By contrast, the invention in its first aspect provides a method and apparatus which preferably enables a wide range of device types to intercommunicate automatically and effectively transparently, by enabling conversion between the protocols. used by a plurality of device types. In this context, the term protocol should be interpreted to encompass, for example, all aspects of formats, standards, ITU recommendations, communications schemes or modes, messaging protocols and the like, as appropriate to the traffic between devices. In its first aspect the invention thus-provides a service provider which acts as a communications node through which traffic passes between devices and which can carry out the necessary conversions of the traffic to enable communication.

Preferably, the service provider may inspect traffic, or data streams, input to it and thus obtain information as to the traffic type. Using this information, and information as to the capability of the destination device(s), the service provider may then advantageously be able to determine what conversion of the traffic may be required (if any) and to implement that conversion.

Advantageously the service provider may determine any required conversion of the traffic in order to try to optimise the efficiency of transfer of the traffic between the transmitting and destination devices. This may mean minimising the amount of traffic conversion required. For example, if traffic is encoded by the transmitting device in a layered, heirarchical structure and the destination device can understand some but not all of the layers of the structure, then only those layers not common to the two devices may need to be converted.

The service provider may therefore advantageously assess the required conversion by comparing the formats, standards and protocols used by the two devices, and also the type of data and bandwidth of the traffic to be transmitted.

Preferably the services provider uses ATM for internal signalling.

Advantageously, the service provider comprises interface means for receiving and transmitting traffic from and to external devices coupled to the service provider and for converting traffic accordingly. The interface means may include a number of network access servers each dedicated to a particular type, or range of similar types, of external device, each server being able to convert traffic between that device type or types to and from a wider range of other device types. Alternatively the interface means may include one or more network access servers able to convert traffic between a wide range of source device types and wide range of destination device types.

In a preferred embodiment, the service provider is coupled to two or more external user devices of different types via one or more network access servers and enables communication between the user devices by converting traffic between the devices according to the protocols used by each device.

In a further aspect of the invention, a method and apparatus is provided for carrying traffic between a first device and a second device, or devices, across an intermediate network. The service provider described above then forms a communications node or interface between the first device and the intermediate network.

Advantageously the second device or devices may be connected via similar service providers, or other exchanges, to the intermediate network.

Advantageously, traffic on the intermediate network is ATM. Particularly advantageously, traffic on the intermediate network is H323 and may be AAL-2, AAL-5 or AAL-1.

If traffic both enters and leaves the network through communications nodes which can carry out any necessary traffic conversion, advantageously conversion is only carried out at one node, or service provider. If two service providers are involved, they negotiate at call set-up to determine which is to convert the traffic. In doing so it is preferable to carry traffic across the network using a protocol which is as compatible as possible with a default protocol of the network. Thus, if transmission from a first device to a second device requires conversion from a first protocol to a second protocol, and the second protocol is the more compatible with the network default protocol, conversion may advantageously be performed before the traffic enters the network. By contrast, if the first protocol is the more compatible with the network default protocol, conversion may advantageously be performed after the traffic leaves the network.

The invention in a further aspect makes use of a service provider structure and method of operation which are particularly suited to implement the method and apparatus of the invention in its various aspects described above.

This aspect of the invention provides a method for connecting a first device to a second device via an intermediate network, the first and second devices using a set of control messages to control media paths between the first and second devices, the method comprising the steps of: establishing a control channel across the intermediate network to carry the set of control messages; intercepting the set of control messages in the intermediate network or in interface devices or service providers coupled thereto and determining a requirement for media paths in response thereto; and in response to the determination, setting up media paths in the intermediate network to connect paths to carry media traffic between the first device and the second device.

In another aspect of the present invention there is provided a method of connecting communication traffic comprised of a plurality traffic components across a broadband network from a device such as a local area network, the method comprising the steps of: in the device or local area network, generating control messages for controlling the traffic components and applying these control messages to an interface of the broadband network; establishing a communication path within the broadband network to carry at least one of the plurality of traffic components; and in the broadband network, using the control messages to control transfer of the plurality of traffic components over the communication path.

In another aspect of the present invention there is provided a method of interconnecting communication traffic across a broadband network from a local area network (LAN), the broadband network having a transfer protocol that supports mini-channels in a virtual circuit-switched environment, the LAN providing the communication traffic as LAN streams to an interface of the broadband network, the method comprising the step of mapping the LAN streams to the mini-channels.

Advantageously, the LAN streams may include audio, video, data and control streams, and the method further comprises the step of interpreting the control streams to set-up mini-channels used to carry at least one of an audio, video and a data communication.

In yet another aspect of the present invention there is provided a connection supervisor for orchestrating the communication of traffic components between first and second devices via an intermediate network, the connection supervisor responsive to control messages communicated between the first and second devices, the connection supervisor including: means for setting up a communication path for carrying the control messages across the intermediate network; means for determining types of control message sent across the communication path; and means for establishing media paths dependent upon types of control message sent across the communication path, the media paths arranged to transfer the traffic components across the intermediate network.

In still yet another aspect of the present invention there is provided a communication node having a network access server (NAS) that provides an interface to a first end-point in a network, the first end-point arranged to initiate a call through the communication node by sending to the NAS a called-party number of a second end-point coupled to an exchange and wherein control messages are communicated between the first end-point and the second end-point, the communication node further comprising: a call supervisor coupled to the NAS and responsive to the called-party number, the call supervisor arranged to select a route to the exchange; and a connection supervisor, coupled to the call supervisor and operationally responsive thereto, the connection supervisor having: i) means to set-up a control channel that supports transfer of the control messages between the NAS and the exchange in response to the call supervisor receiving the called-party number; ii) means for determining types of control message sent across the control channel; and iii) means for establishing media paths between the NAS and the exchange dependent upon types of control message sent across the control channel, the media paths arranged to transfer traffic components across the communication node.

In a preferred embodiment, the communication node is a broadband network and the control channel and the media paths are virtual channels.

Beneficially, the preferred embodiments of the present invention generally provide an ability of interconnecting a first device through a seamless public or private broadband network (supporting narrowband or broadband telephony) to another device, wherein the devices may be of different types.

BRIEF DESCRIPTION OF THE DRAWINGS

Specific embodiments and aspects of the present invention will now be described by way of example with reference to the accompanying drawings, in which.

DESCRIPTION OF THE PREFERRED EMBODIMENT

In a preferred embodiment, the invention may advantageously provide Unified Multimedia Access, which is a method of providing multimedia access to many different types of user.

Figure 1:
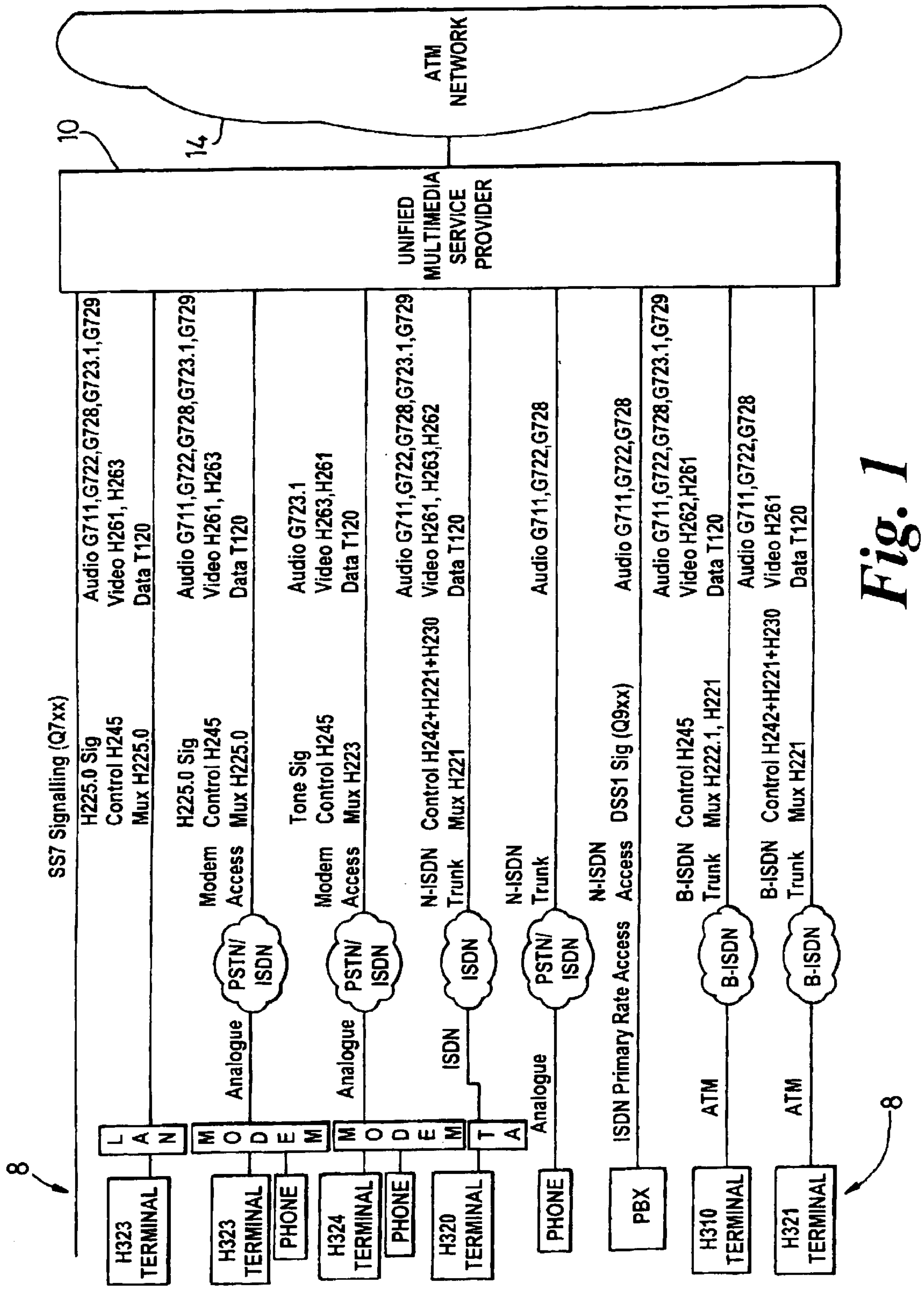
FIG. 1 is a block diagram of a service provider according to a first embodiment of the invention coupled between a plurality of user device types and an ATM network.
Figure 2:
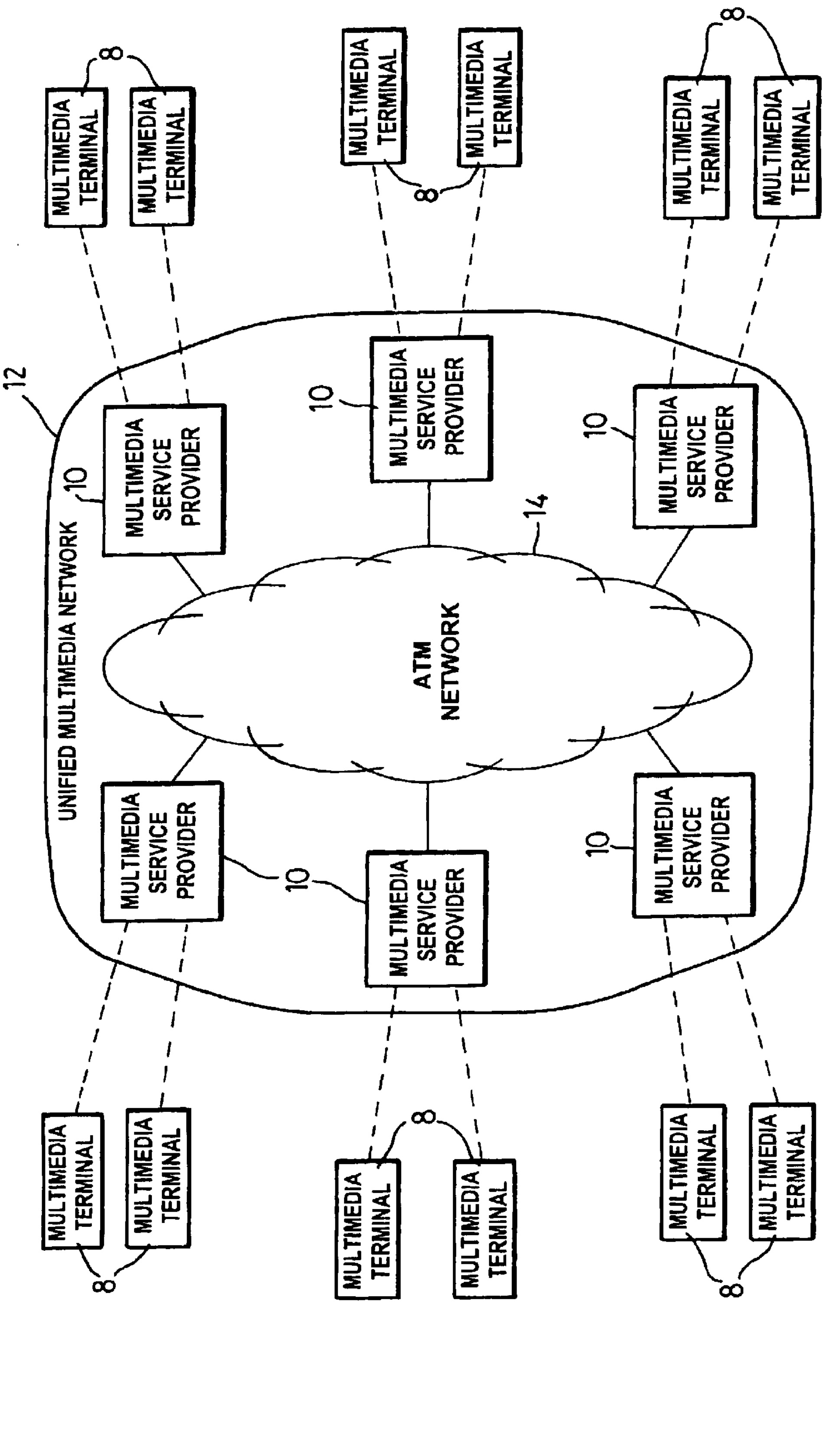
FIG. 2 is a block diagram of a plurality of user devices interconnected via service providers according to the first embodiment and an ATM network.
Figure 3:
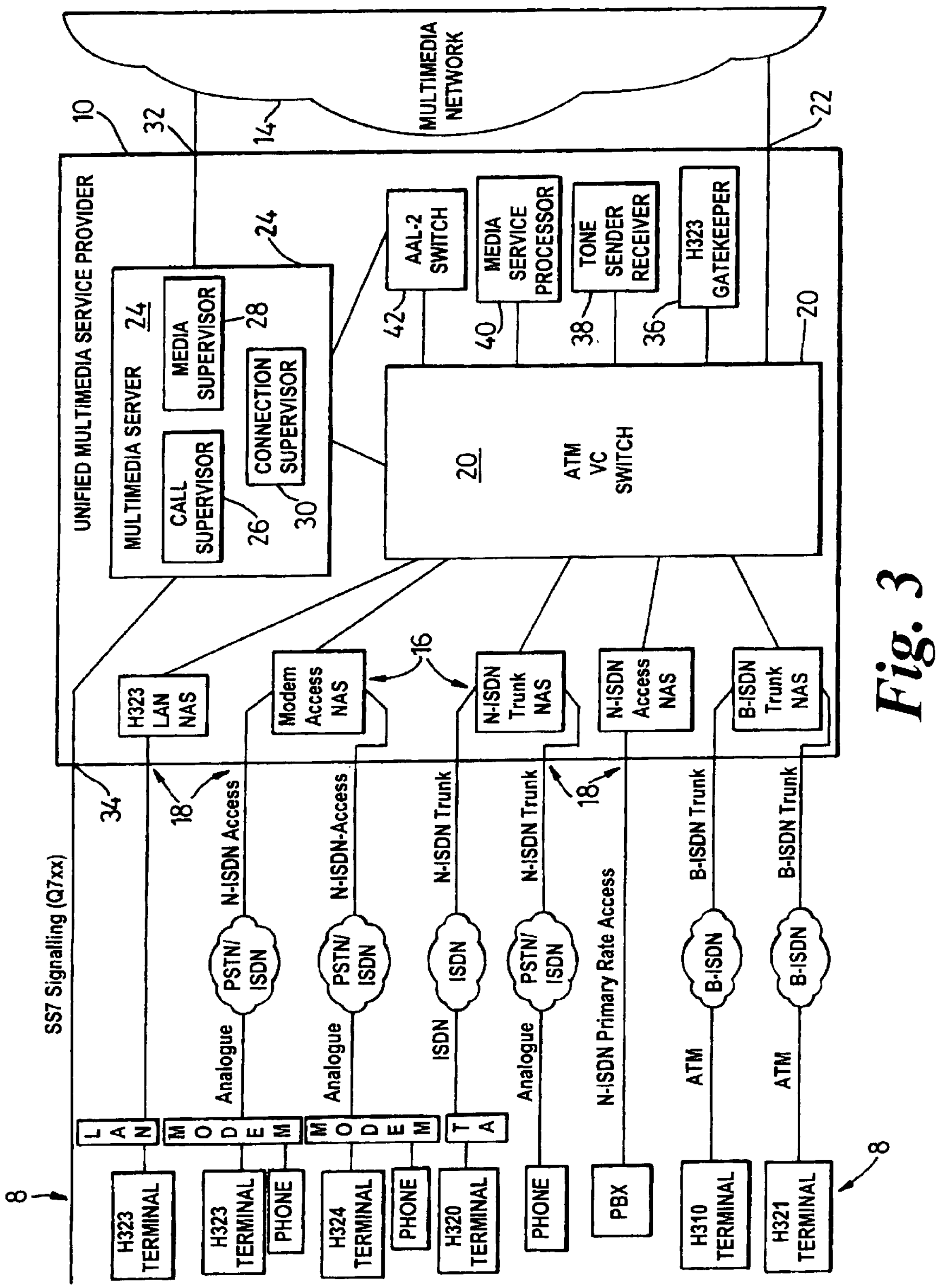
FIG. 3 is a block diagram of the structure of the service provider of the first embodiment.

It may advantageously enable any user with a multimedia terminal 8 to make multimedia calls, which are sufficiently compatible with calls of a predetermined protocol (such as H323), to any other compatible multimedia terminal 8 by making use of a Multimedia Service Provider 10 according to a first embodiment of the invention, as illustrated in FIGS. 1, 2 and 3.

Although the Multimedia Service Provider 10 uses H323 as its reference basis, it supports other types of multimedia users just as well as H323 users. Currently it supports H323, H324, H310, H320 and H321 multimedia users. It can also serve non-multimedia users such as N-ISDN-or B-ISDN users, plus traditional phone calls and PBXs.

The service provided by the Multimedia Service Provider 10 is such that all these different types of user may advantageously interwork with each other in an efficient manner which is transparent to the end users.

Each Multimedia Service Provider 10 is both a dial-up service provider and a multimedia exchange which can switch multimedia calls. For its dial-up mode, it has a modem interface. For its exchange mode, it has N-ISDN and B-ISDN trunk interfaces and N-ISDN and B-ISDN access interfaces.

The Multimedia Service Provider 10 has a LAN interface, and thus fully serves H323 users. It provides any necessary LAN-gateway features and provides an H323 Gatekeeper.

By linking many Multimedia Service Providers embodying the invention together a unified multimedia network 12 embodying a second aspect of the invention can be obtained. This is illustrated in FIG. 2. In the network, a plurality of Multimedia Service Providers are linked by an ATM network 14. Such a network can be as small or as large as desired. This network provides an efficient way of connecting together different types of multimedia users who are spread over a geographical distance.

This multimedia network avoids the need for unnecessary conversions between different protocols, thus giving it an advantage compared with the use of conventional dedicated gateways which always perform a full set of conversions.

Although the default mode of the unified multimedia network 12 is H323, other types of multimedia calls are not unnecessarily converted into H323. For example, if both end users are H310 terminals using native mode and AAL-5, then the call will stay as H310 native mode above AAL-5 when it traverses the unified multimedia network. This is an example of only partial conversion of a stacked or layered protocol, but other examples of similar partial conversions may clearly be implemented.

The transport infrastructure of the multimedia network 12 is ATM. It supports AAL-5, AAL-2 and AAL-1.

Across the multimedia network, the current default for the transport of H245 messages is AAL-5, and the current default for the transport of audio, video and data is AAL-2.

The design of the multimedia network can also support all AAL-5 or all AAL-2. It will also support AAL-1.

An important feature of the Multimedia Service Provider 10 is that, for any particular call, the Multimedia Service Provider will select the adaptation layers which appear to be the most efficient and cause the least conversions for that call.

At the call establishment level, the signalling across the multimedia network 12 is Signalling System No. 7(SS7). SS7 will be expected to accompany trunk circuits from N-ISDN and B-ISDN networks. At its boundaries, the multimedia network will accept H323/H225.0, DSS1 and DSS2 as access signalling systems. To cater for H324 users via a modem, multifrequency tone signalling is supported.

A prime objective of the Multimedia Service Provider and its associated multimedia network is advantageously to allow different types of multimedia terminals to interwork in a more efficient and transparent manner than in prior art systems.

Thus, if one terminal makes a multimedia call to another terminal, it need not be aware of whether or not the other terminal is of the same type as itself. It may simply exchange capability information with the other terminal and select a common denominator regarding the encoding of the audio and video, etc. The Multimedia Service Provider intercepts such media control information and uses this information not only to set up suitable media channels, but also to determine what conversions, if any, need to be made.

Internally, the plurality of Multimedia Service Providers and their associated network according to the embodiments of the invention discussed above use H245 media control messages. If one or both terminals communicating across the network uses H230 media control signals, these will be converted into the corresponding H245 messages because each Multimedia Service Provider 10 is internally all message based.

The media encoding itself (e.g. G711 audio or H261 video, etc.) need never be converted.

The media transport will not be unnecessarily converted. For example, if at the boundaries of the multimedia network both sides of a call use AAL-5, then the transport will be kept as AAL-5 internally within the network. If a conversion is needed, the Multimedia Service Provider will select the transport type across the network to reduce segmentation and re-assembly and to reduce packet overheads (due to headers, etc.).

If at the boundaries of the multimedia network, the call does not use ATM, then the internal detail of AAL-2 will be used as transport across the multimedia network.

MSP Roles

The Multimedia Service-Provider (MSP) 10 is both a service provider for dial-up users who wish to make multimedia calls and an exchange which can switch multimedia calls.

In its role as a dial-up service provider, the MSP services H323 terminals and H324 terminals. The terminals make a normal telephone call to the MSP, with the MSP as the called party. The terminals then signal to the MSP the required ultimate called party, and the MSP sets up a multimedia call to that party.

In its role as a multimedia exchange, the MSP acts as an exchange which is specifically designed to handle multimedia calls. If is tailored towards H323 calls, but can also handle other types of multimedia calls. In addition to its multimedia role, the MSP can handle ordinary narrowband ISDN calls in the same manner as an ordinary ISDN telephone exchange. It is capable of handling broadband ISDN calls.

MSP Infra-structure

ATM communication and switching is used within the MSP and for interconnection between associated MSPs, i.e. within the multimedia network.

All calls which enter an MSP 10 from outside the multimedia network 12, are converted from their existing type of transport to an ATM transport. Either AAL-5, AAL-2 or AAL-1 are used, as appropriate. The MSP 10 contains an ATM VC switch, which can switch virtual paths and virtual channels and also an AAL-2 switch which can switch AAL-2 mini-channels. The MSP can also perform conversions between AAL-5, AAL-2 and AAL-1.

Within the MSP's multimedia network, AAL-2 is the default for audio, video and data paths, and AAL-5 is the default for all other paths. However, for any particular call, the most convenient type of adaptation layer is used.

MSP Scone

The MSP can service many different types of multimedia protocols and terminals. The embodiments described in this document consider only a representative set. In the MSP's dial-up mode, this document considers H323 and H324 terminals (via a modem). In the MSP's exchange mode, this document considers H323 terminals connected via a LAN, H320 terminals connected via N-ISDN trunks, H310 and H321 terminals connected via a B-ISDN trunk, ordinary phones connected via an N-ISDN trunk, and PBXs connected via N-ISDN access.

FIG. 1 sets out details of a plurality of terminal types and communication types, protocols and connections which the MSP 10 of the embodiment can accommodate.

However, the design of the MSP according to the invention is not restricted to the embodiments considered in this document. For example, it can also handle H323 terminals and H310 (native mode) terminals directly connected to an MSP (via an access line), H310 terminals using a dial-up mode, etc.

MSP Principles

The MSP 10 is optimized for H323 calls. So, where appropriate (but only where appropriate), multimedia calls from outside the MSP's multimedia network are converted to H323 calls.

The MSP assumes that multimedia calls are set up in two stages. In the first stage, call signalling (e.g. H225.0 call signalling) is used for the set-up of the call in a similar manner to the set-up of a telephone call, but actually only a control channel is set up and not the complete call. In the second stage, this control channel is used to carry control messages (e.g. H245 messages) which are used for the set-up of the audio, video and data channels. The MSP also supports H225.0 RAS messages.

Media Paths

The normal default will be AAL-2. However, based upon the compatibility information (within the H245 control messages or H230 control signals) which is exchanged between the end terminals when setting up a call, and upon the transport mode used by the call at the boundaries of the multimedia network, a decision might be made by the MSP to use a different adaptation layer. For example, if both end terminals themselves-use ATM and both use AAL-5 then the MSP will keep the media channel as AAL-5 in order to avoid data conversion.

Protocols

For calls which enter a MSP 10 via a LAN interface from an H323 terminal, no protocol conversion is required. H225.0 call signalling messages, H225.0 RAS messages and H245 control messages are handled as standard.

For calls which enter via an N-ISDN or B-ISDN trunk, SS7 N-ISUP or B-ISUP is used for call signalling.

For multimedia calls which enter via an N-ISDN or B-ISDN trunk and which use FAS and BAS signals for control signalling (as per H320/H230), a conversion is made from the BAS signals into H245 control messages.

For multimedia calls which enter via an N-ISDN or B-ISDN trunk and which do not use FAS signals, the initial B-channel information is searched for message delimiters. If found, the messages are treated as H245 messages.

If no FAS signals or message delimiters are found, the trunk call will be treated as an ordinary speech call. Also if the call is classed as a speech call in the call signalling message, the call will be treated as a simple speech call. In this situation, there will be only one stage to the call set-up, i.e. the channel set up due to call signalling (the first stage of call set up described above) will be used for the speech path.

For calls entering via an N-ISDN access line from directly attached equipment (e.g. a PBX), it is assumed that the call signalling will use DSS1. The bearer capability field in the DSS1 Setup message will dictate the treatment of the call.

For calls which dial up the MSP, the initial call signalling (e.g. DSS1) is used merely to connect the terminal to the MSP. The B-channel information is initially searched by the MSP for either MF tones or messages (i.e. H225,0 messages). For H324 terminals, the MF tones will be call signalling for the wanted call. In both cases, it is assumed that H245 control messages will be used.

Multimedia Service Provider Structure

FIG. 3 illustrates the internal structure of a MSP 10 linking external terminals 8 to an ATM network 14.

The MSP 10 comprises a plurality of network access servers (NASs) 16 coupled to ports 18 for connection to corresponding user terminals 8. Each NAS is adapted to receive signals from a particular type or range of types of user terminal via a particular type or range of types of connection. Within the MSP 10 each NAS 16 is coupled to an ATM Virtual Channel (VC) switch 20.

The ATM VC switch is coupled via a port 22 to the ATM network 14 for sending and receiving multimedia signals across the network.

The MSP 10 is controlled by a multimedia server 24 (which is an example of a traffic supervisor) which comprises a call supervisor 26, a media handler 28 and a connection handler 30, These three components are interconnected and their functionality will be described below. The multimedia server 24 is connected to the ATM VC switch 20 to control the data handling of the MSP. It is also connected via a port 32 to the ATM network 14 for handling the trunk signals used at call set up for negotiation between the calling terminal and the called terminal, and via a port 34 for communicating directly with user terminals or other networks or exchanges using SS7 signalling, which the multimedia server 24 can receive and transmit directly.

The ATM VC switch 20 is connected to a plurality of resources to allow the MSP to handle a variety of signalling or communications protocols. These resources include an H232 gatekeeper 36, a tone sender/receiver 38, and a media service processor 40. An AAL-2 switch 42 is coupled to the ATM VC switch and the multimedia server to allow the handling of AAL-2 signals.

The operation of the MSP and its components will now be described in more detail.

Multimedia Server

The Multimedia Server 24 provides a platform for the software of the Call Supervisor 26, the Media handler 28 and the Connection handler 30.

Multimedia Server: Call Supervisor

The Call Supervisor 26 provides the main call handling functions for the Multimedia Service Provider. It always analyses the called party's telephone number. For outgoing calls, it selects the outgoing route and the trunk circuit within that route. For terminating calls (e.g. to a PBX), it finds the access circuit(s) belonging to the called party. It performs all the normal call handling functions provided by an exchange, including those required for supplementary services, for the call. It oversees the release of the call. It generates call records, as required.

The Call Supervisor receives, interprets and generates call signalling messages as required.

It delegates the connection and disconnection of cross-office paths (signal paths within the multimedia server 24) to the Connection handler 30.

The Call Supervisor deals with call signalling messages. It never receives, nor is it aware of, H245 control messages. When the Call Supervisor has set up a call, based upon the information received in the call signalling messages, it believes it has set up the whole call. In actual fact, for a multimedia call, it has only set up the H245 control channel. This is the first stage of call set up described above. In the second stage, it is the Media handler 28, not the Call Supervisor 26, which sets up the audio, video and data paths for a multimedia call.

Multimedia Server: Media Handler

For multimedia calls, the Media handler 28 oversees the set-up and release of the channels used for audio, video and data. For this, it delegates the actual connection and disconnection of the cross-office paths to the Connection-handler 30. It generates media channel records, as required.

All H245 control messages received by an MSP 10 are passed to the Media handler 28. The Media handler receives, interprets and generates or re-generates H245 control messages as required.

The Media handler makes use of the information within the H245 control messages, and information concerning the point of entry/exit of the call, when deciding the type of media path to set up. It endeavours to avoid unnecessary conversions.

Multimedia Server: Connection Handler

The Connection handler 30 oversees cross-office paths. When required, it connects or disconnects such paths.

When relevant, the Connection handler selects ATM virtual paths, virtual channels and AAL-2 mini-channels for use in conjunction with ports of the ATM VC Switch 20 and/or the AAL-2 Switch 42.

Regarding requests from the Call Supervisor to connect a path, the Connection handler understands routes, trunk circuits and access circuits (as used by the Call Supervisor and call signalling systems) and selects appropriate virtual channels or mini-channels which are suitable for use as such trunk circuits or access circuits.

The Connection handler selects suitable virtual channels and mini-channels (when using AAL-2) for use as media paths when requested to do so by the Media handler.

H323 Gatekeeper

The H323 Gatekeeper 36 provides all normal H323 gatekeeper functions. For example, it receives, interprets and generates RAS messages as required, and performs alias and address translations, as required.

Network Access Servers

The Network Access Servers 16 are the interface between the Multimedia Service Provider and the trunk circuits or access circuits which the Multimedia Service Provider serves.

The Network Access Servers provide any necessary conversion between the transmission modes and protocols used outside the Multimedia Service Provider and those used within the Multimedia Service Provider and its associated multimedia network.

Media Service Processor

The Media Service Processor 40 provides services for the media channels, i.e. the audio, video and data channels. For example, it provides echo cancellation, voice compression and silence suppression, when required, and performs conversions between AAL-5, AAL-2 and AAL-1, when required.

ATM Virtual Channel Switch

This is a conventional ATM virtual channel switch 20.

AAL-2 Switch

The AAL-2 Switch 42 switches at the AAL-2 mini-channel level. Mini-channels which enter this switch via the same virtual channel can leave via separate virtual channels.

Tone Sender-Receiver

The Tone Sender-Receiver 38 performs a conversion between MF time signals, as generated by telephones, and call signalling messages, as understood by the Call Supervisor 26.

Operation of the Multimedia Service Provider

Several examples of the operation of the MSP 10 in handling different types of multimedia calls between different terminal types will now be described by way of example. As will be evident, the same principles of operation can be extended to handle a wide range of other call types.

These examples illustrate communications with an H232 LAN, an H232 Modem, an H324 Modem, an H323 trunk connection, a GSTN trunk connection, a narrowband N-ISDN access connection, an H310 trunk connection and an H321 trunk connection.

This wide range of service types could conventionally only be connected by the use of dedicated gateways between each pair of services using different modes of communication. However, the embodiments of the invention described herein advantageously permit effectively transparent multimedia communication between all of these modes of communication with a minimum of data conversion or translation.

H323-LAN Terminal Service

Figure 4:
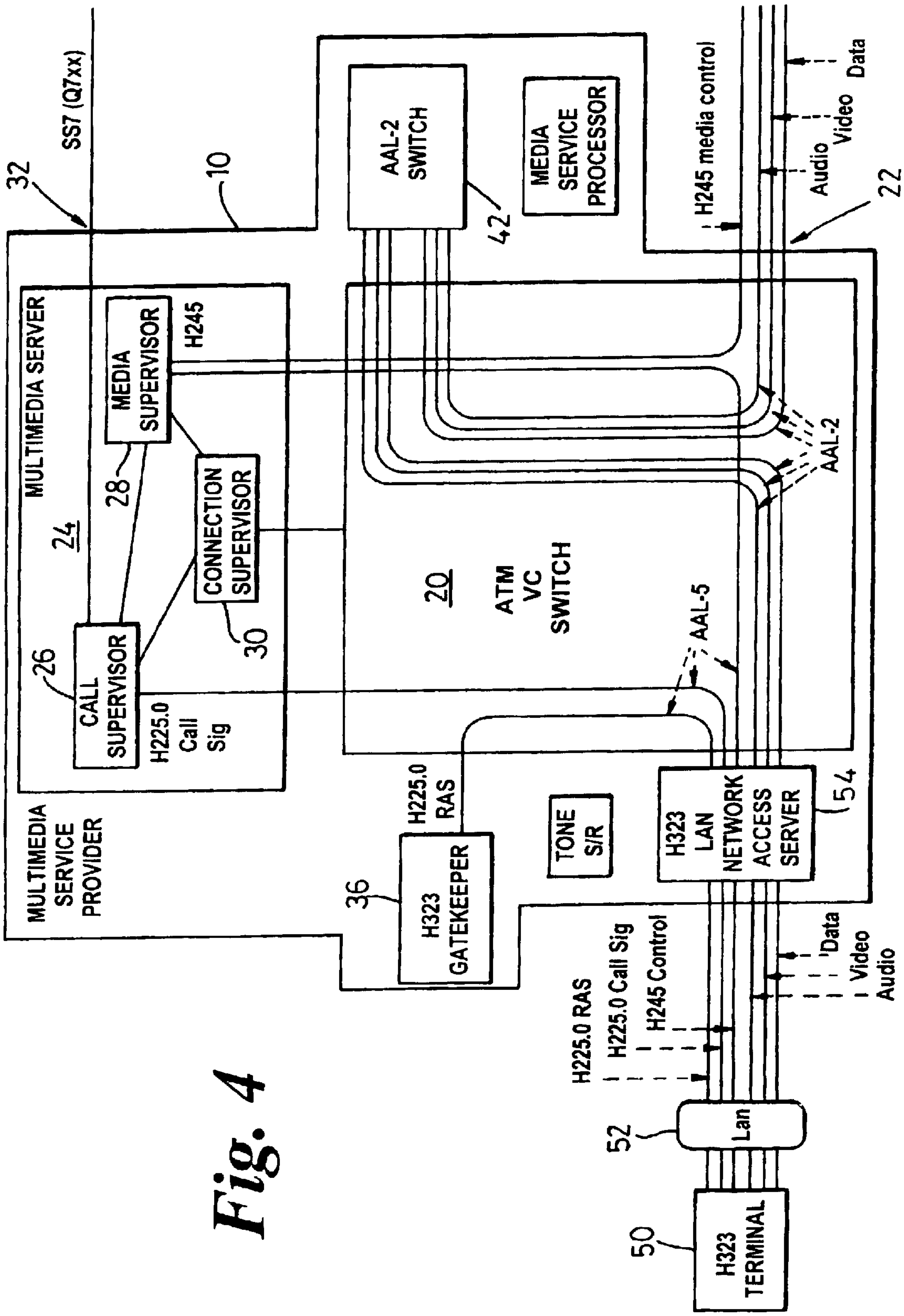
FIG. 4 illustrates an H323 terminal coupled to the service provider of the first embodiment via a LAN.

An H323 call via a LAN is illustrated in FIG. 4. Similar components are shown with the same reference numbers as in earlier figures.

H323 Calls via a LAN

The H323 terminal 50 makes standard H323 calls, as if there is a LAN-WAN end-to-end. To the LAN 52, the H323-LAN NAS 54 looks like an H323 Endpoint (e.g. a gateway).

The H323 terminal has the option of using a conventional H323 Gatekeeper which is connected to its LAN. Alternatively, the H323 terminal can use the H323 Gatekeeper which is provided as part of the Multimedia Service Provider. The H323 terminal will use H225.0 RAS messages to communicate with the Gatekeeper it is using.

The H323 terminal will use H225.0 call signalling message to set up and release the H323 call.

The H323 terminal will use H245 control messages to exchange capability information with the far-end multimedia terminal, and to set-up and release audio, video and/or data channels.

Each H323 call can use any mixture of audio, video and/or data channels.

The H323 terminal can set up many simultaneous H323 calls to many different multimedia terminals.

H323-LAN Network Access Server

This NAS 54 expects calls from the H323 terminal to enter it via a LAN termination.

The NAS will convey the H225.0 call signalling for H323 calls to the MSP's Call Supervisor 26 (virtually no conversion is needed as H225.0 call signalling is based upon DSS1 (Q931) and vice versa.

Any H225.0 RAS messages received will be conveyed to the MSP's H323 Gatekeeper 36 and vice versa.

All information received from the LAN will be converted by the NAS from the LAN (PIP) packets into ATM packets and vice versa. The H225.0 call signalling, the RAS, and the H245 control messages normally will be converted into suitable AAL-5 packets. The audio, video and data packets normally will be converted into AAL-2 packets. However, optionally, all could be converted into AAL-5 packets or all could be converted into AAL-2 packets. The original H323 packets (IP packets) will be segmented and enveloped into the AAL-5/AAL-2 packets.

H323—Modem Terminal Service

Figure 5:
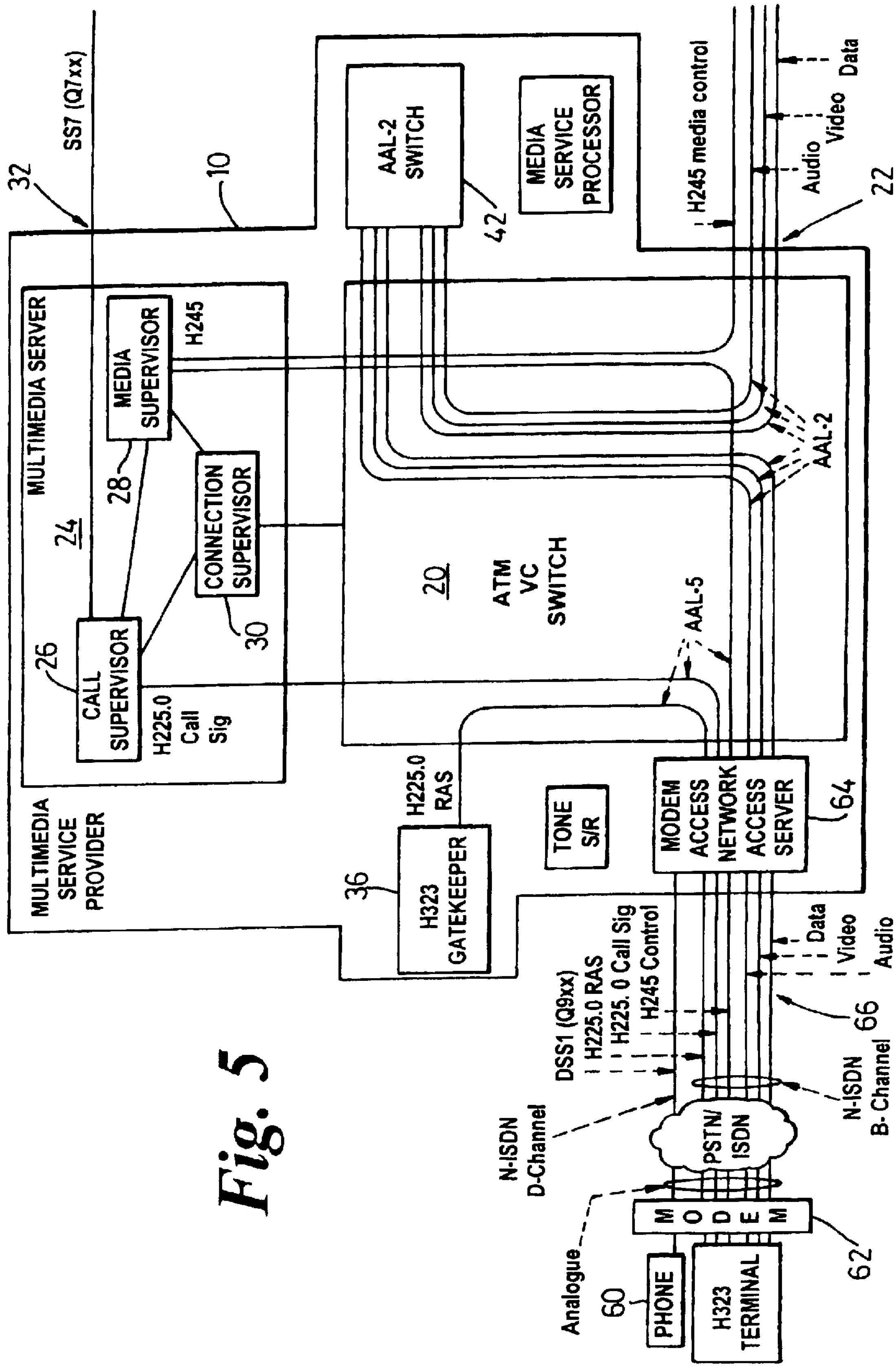
FIG. 5 illustrated an H323 terminal coupled to the service provider of the first embodiment via a modem.

This mode of communication is illustrated in FIG. 5.

Calls to the Multimedia Service Provider

In this example, an H323 User makes a standard telephone call via a modem 62 to the Multimedia Service Provider. To do this, the user dials the DN of the Multimedia Service Provider; this dialling can be via a normal phone 60 or via a phone facility within the user's PC.

After the Multimedia Service Provider has answered the call, the user can use his H323 terminal to make H323 calls to other H323 terminals, or to other multimedia terminals which the Multimedia Service Provider also serves.

Within the one telephone call, the H323 terminal can set up as many H323 calls to as many different multimedia terminals as desired, providing that the total bandwidth used within the telephone call is with the capability of the modem used.

H323 Calls via the Multimedia Service Provider

The H323 terminal will use H225.0 call signalling messages to set up and release the H323 call.

The H323 terminal will use H245 control messages to exchange capability with the far-end multimedia terminal, and to set-up and release audio, video and/or date channels.

Each H323 call can use any mixture of audio, video and/or data channels.

H323 Call Handling

Upon receipt of the H225.0 call signalling messages, the Call Supervisor 26 will set up the call. It will believe that the whole call has been set up; in reality, only the H245 control channel is set up by to the Call Supervisor. The Media handler 28 is responsible for setting up the media channels.

Modem-access Network Access Server

This NAS 64 expects calls from the remote terminal to enter it via an N-ISDN access line 66. Signalling for the telephone call will be received/sent via the ISDN D-channel. All other information will received/sent within the ISDN B-channel.

The NAS 64 will behave as a subscriber with respect to the D-channel signalling. The NAS will assume the call has come from an H323 or H324 terminal which is using a modem. The NAS will constrain a modem function to demultiplex/multiplex the B-channel information.

The NAS will inspect the initial information arriving on the B-channel to see if it is a sequence of packets or if it is a tone. If it is a sequence of packets, the NAS will assume that the are H225.0 packets. It will inspect the packets to see if they are H225.0 call signalling packets or if they are H225.0 RAS packets. Subsequent packets might be H245 control packets. Later packets might be audio, video or data packets.

The NAS will convey the received H225.0 call signalling packets to the MSP's Call Supervisor 26 (virtually no conversion is needed as H225.0 call signalling is based upon DSS1 (Q931) and vice versa.

Any H225.0 RAS packets received will be conveyed to the MSP's H323 Gatekeeper 36.

H245 control packets will be conveyed to the Media handler and vice versa.

All-information received from the N-ISDN access line will be converted by the NAS from the framed ISDN stream into ATM packets and vice versa. The H225.0 call signalling, the RAS, and the H245 control messages normally will be converted into suitable AAL-5 packets. The audio, video and data packets normally will be converted into AAL-2 packets. However, optionally, all could be converted into AAL-5 packets or all could be converted into AAL-2 packets. The original H323 packets (IP packets) will be segmented and enveloped into the AAL-5/AAL-2 packets.

H324 Modem Terminal Service

Figure 6:
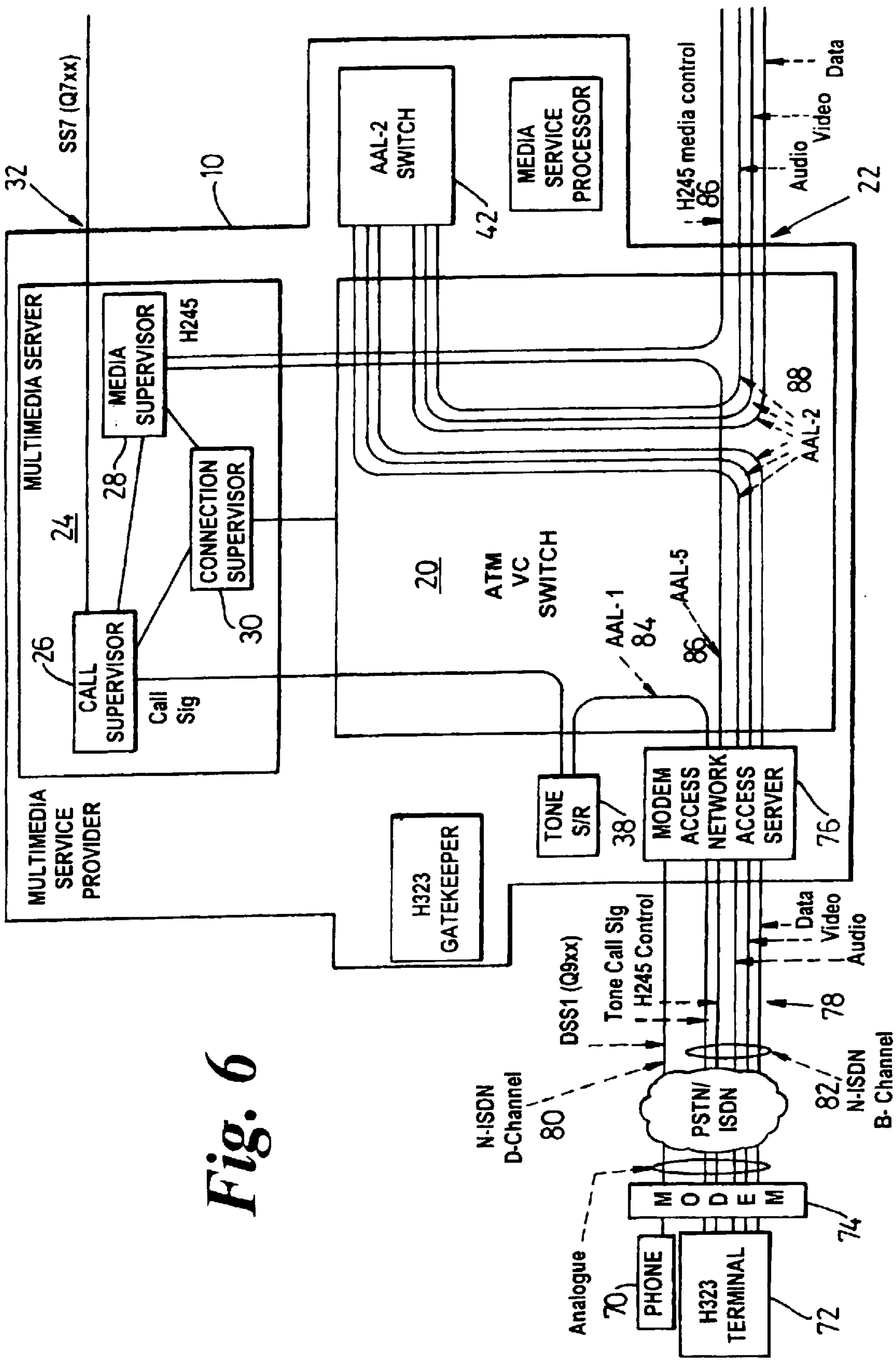
FIG. 6 illustrates an H324 terminal coupled to the service provider of the first embodiment via a modem.

This type of communication is illustrated in FIG. 6.

Calls to the Multimedia Service Provider

The H323 User makes a standard telephone call to the Multimedia Service Provider.

To do this, the user dials the DN of the Multimedia Service Provider; this dialling can be via a normal phone 70 or via a phone facility within his PC 72 and a modem 74.

After the Multimedia Service Provider has answered the call, the user can use his H324 terminal 72 to make H324 calls to other H324 terminals, or to other multimedia terminals which the Multimedia Service Provider also serves.

Within the one telephone call, the H324 terminal can set up as many H324 calls to as many different multimedia terminals as desired, providing that the total bandwidth used within the telephone call is with the capability of the modem used.

H324 Calls via the Multimedia Service Provider

The H324 terminal will use MF tone signalling to set up and release the H324 call.

The H324 terminal will use H245 control messages to exchange capability information with the far-end multimedia terminal, and to set-up and release audio, video and/or date channels.

Each H324 call can use any mixture of audio, video and/or data channels.

Modem-access Network Access Server

This NAS 76 expects calls from the remote terminal to enter it via an N-ISDN access line 78. Signalling for the telephone call will be received/sent via the ISDN D-channel 80. All other information will received/sent within the ISDN B-channel 82.

The NAS will behave as a subscriber with respect to the D-channel signalling. The NAS will assume the call has come from an H323 or H324 terminal which is using a modem. The NAS will contain a modem function to demultiplex/multiplex the B-channel information.

The NAS will inspect the initial information arriving on the B-channel to see if it is a sequence of packets or is an MF tone. If it is a tone, the NAS will assume that the call is from a H324 terminal.

The NAS will convey the received tone signals to the Tone Sender/Receiver 38. This will convert the signals into messages and send them to the MSP's Call-Supervisor 26. The corresponding conversion will be performed in the opposite direction.

H245 control messages will be conveyed to the Media handler 28 and vice versa.

All information received from the N-ISDN access line will be converted by the NAS from the framed ISDN stream into ATM packets and vice versa. The tone signals normally will be placed into suitable AAL-1 packets 84. The H245 control messages normally will be converted into suitable AAL-5 packets 86. The audio, video and data packets normally will be converted into AAL-2 packets 88. However, optionally, all could be converted into AAL-5 packets or all could be converted into AAL-2 packets. The original H324 packets (IP packets) will be segmented and enveloped into the AAL-5/AAL-2 packets.

H320 Trunk Service

Figure 7:
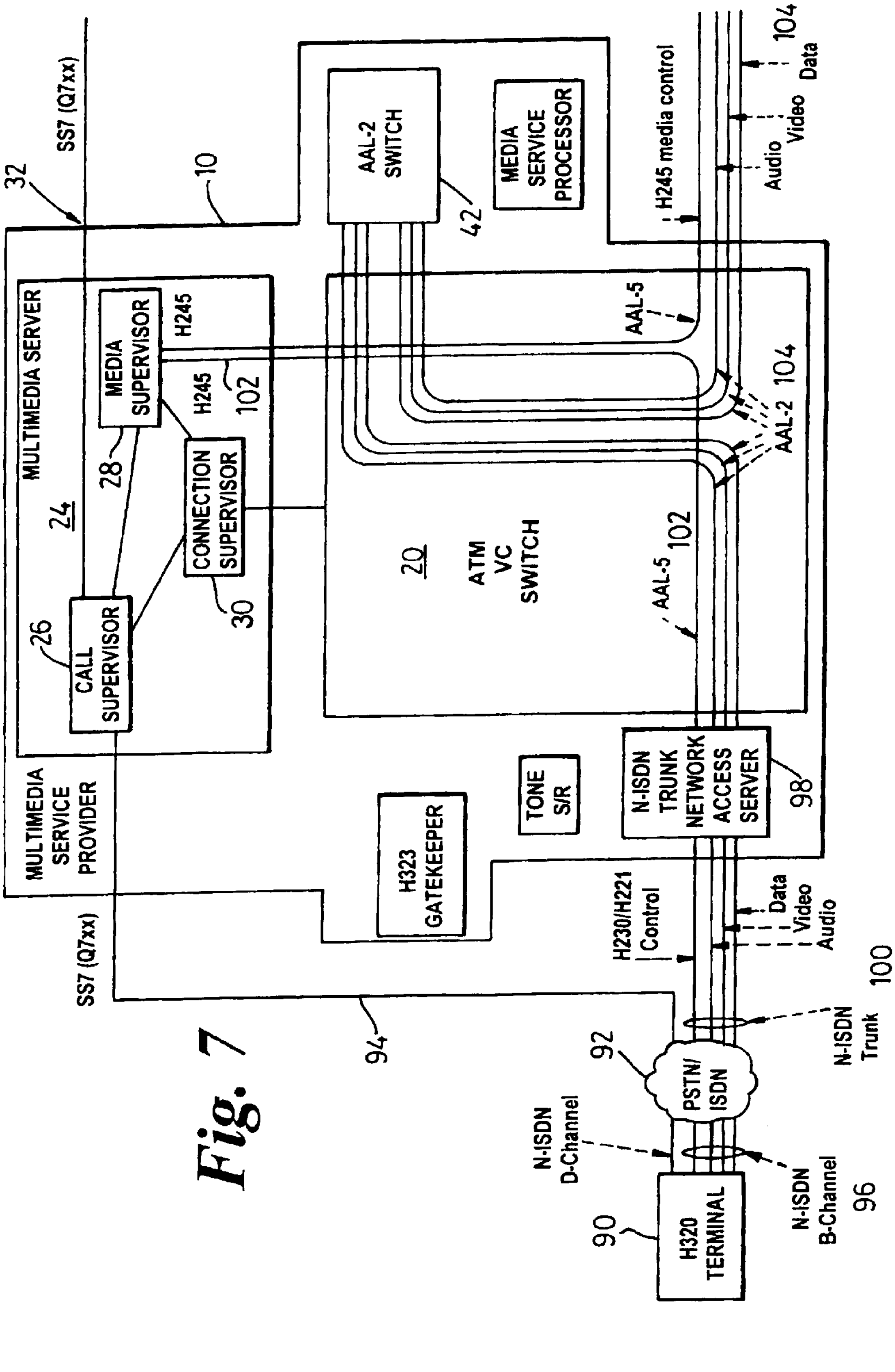
FIG. 7 illustrates an H320 terminal coupled to the service provider of the first embodiment via a PSTN/ISDN exchange.

This type of communication is illustrated in FIG. 7.

H320 Calls via an ISDN

The ISDN exchanges can treat the Multimedia Service Provider as another ISDN exchange.

In this situation, the H320 terminal 90 will make a normal H320 call to a distant H320 terminal or to another type of multimedia terminal, as if there is a N-ISDN end-to-end. If the conventional ISDN exchanges associate the destination with the Multimedia Service Provider then they should route the call via the Multimedia Service Provider treating the latter as an exchange.

The H320 terminal will use DSS1 (Q931, Q932, etc.) call signalling messages to set up and release the H320 call.

The N-ISDN exchange 92 will use SS7 for call signalling 94 to and from the Multimedia Service Provider.

The H320 terminal will use the H242/H221/H230 procedures to exchange capability information with the far-end multimedia terminal, and to support the audio, video and/or data streams. These procedures use in-band signals, which steal bits from the B-channels.

An H320 call can use more than one 64 kbit/s B-channel 96, i.e. as many as desired up to a maximum of 1920 kbit/s. Each H320 call can use any mixture of audio, video and/or data streams.

N-ISDN Trunk Network Access Server

This NAS 98 expects calls. from the H320 terminal to enter it via an N-ISDN trunk line 100, i.e. as a B-channel. The associated call signalling 94 will be sent separately (using SS7) directly to the call supervisor 26 and will not be processed by the NAS.

The NAS will search the B-channel information for FAS signals, and if found, will extract the FAS, BAS and C&I signals from the B-channels (as per H242/H221/H230 procedures), convert them into H245 control messages 102, and then send them to the Media handler. In the opposite direction, the NAS will perform the corresponding opposite functions; i.e. converting H245 messages into the relevant FAS, BAS and C&I signals, and inserting them into the B-channels.

All information received from the N-ISDN B-channels will be converted by the NAS from the N-ISDN streams into ATM packets and vice versa. For the audio, video and data streams, the NAS will extract the FAS & BAS bits and make use of the information in the BAS bits to segregate the audio, video and/or data streams 104.

The H245 control messages normally will be placed in suitable AAL-5 packets 102. The audio, video and data streams normally will be placed in AAL-2 packets 104. However, optionally, all could be converted into AAL-5 packets or all could be converted into AAL-2 packets.

GSTN Trunk Service

Figure 8:
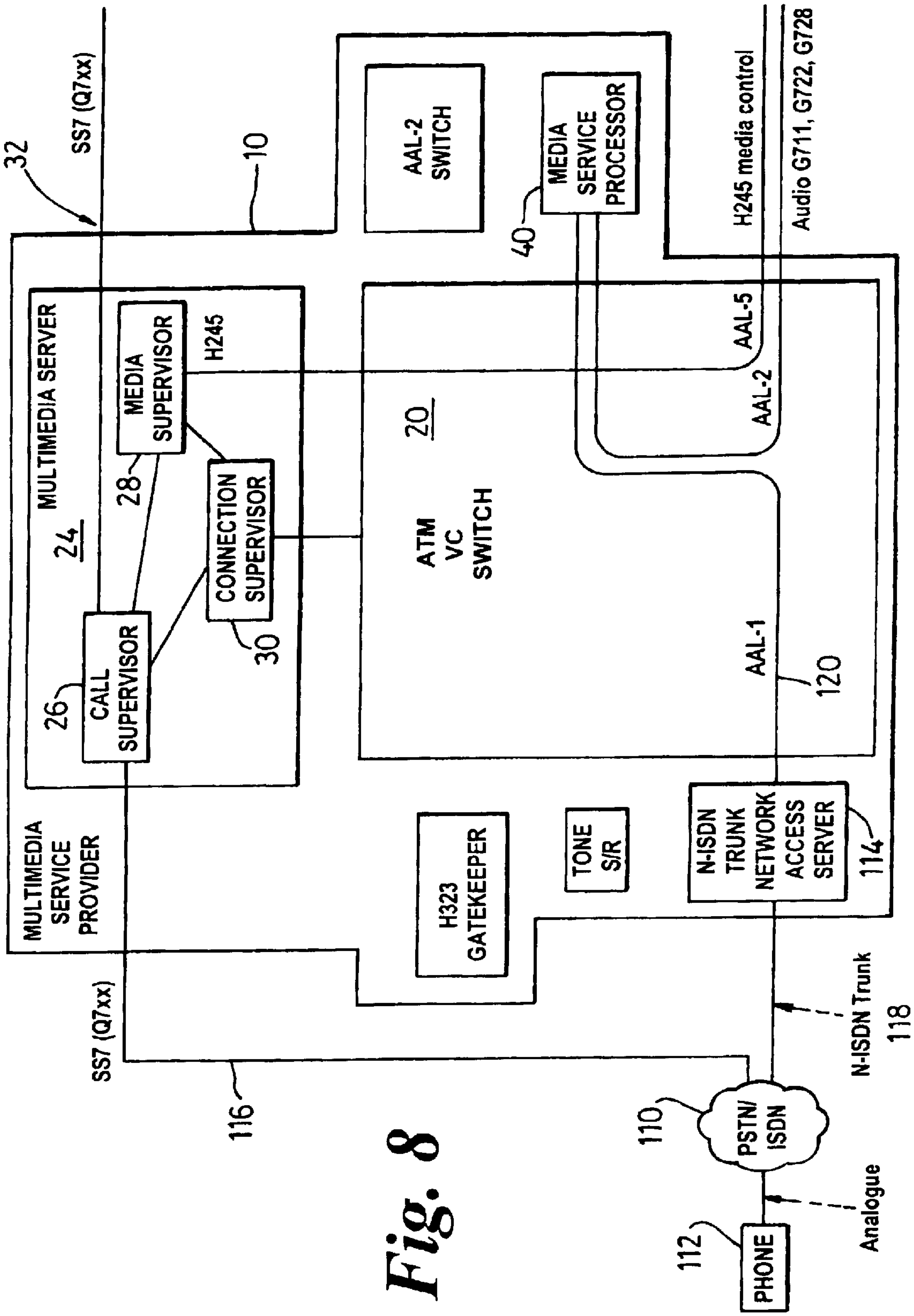
FIG. 8 illustrates a phone coupled to the service provider of the first embodiment via a PSTN/ISDN exchange.

This type of communication is illustrated in FIG. 8.

Phone/GSTN Calls via a PSTN/ISDN

A PSTN (public switched telephone network)/ISDN exchange 110 can treat the Multimedia Service Provider as another ISDN exchange.

In this situation, a User with an analogue line will make normal phone call from their phone 112 to a distant phone, as if there is a PSTN end-to-end. If the conventional PSTN/ISDN exchanges associate the destination with the Multimedia Service Provider then they should route the call via the Multimedia Service Provider treating the latter as an exchange.

The analogue phone 112 will use traditional signalling procedures (i.e. MF tone signalling or loop-disconnect signalling) to set up and release the phone call.

The N-ISDN 92 exchange will use SS7 for call signalling 116 to and from the Multimedia Service Provider.

N-ISDN Trunk Network Access Server

This NAS 114 expects calls from the terminal or phone 112 to enter it via an N-ISDN trunk line 118, i.e. as a B-channel. The associated call signalling 116 will be sent separately (using SS7) and will not be processed by the NAS.

The NAS will search the B-channel information for FAS signals (as per H221). If none are found, the NAS will assume that the call is a simple non-H320 call.

The call's type of transmission can be obtained from the Call Supervisor 26. The Transmission Medium Requirement is within the SS7 IAM.

All information received from the N-ISDN B-channels will be converted by the NAS from the N-ISDN streams into ATM, packets 120 and vice versa.

The information received from the B-channel will be converted by the NAS from the N-ISDN stream into ATM packets 120 and vice versa. Normally AAL-1 packets will be used for speech or 3.1 kHz transmission medium; AAL-5 might be used for other types of transmission. However, optionally, all could be converted into AAL-1, or AAL-5 or AAL-2 packets.

N-ISDN Access Service

Figure 9:
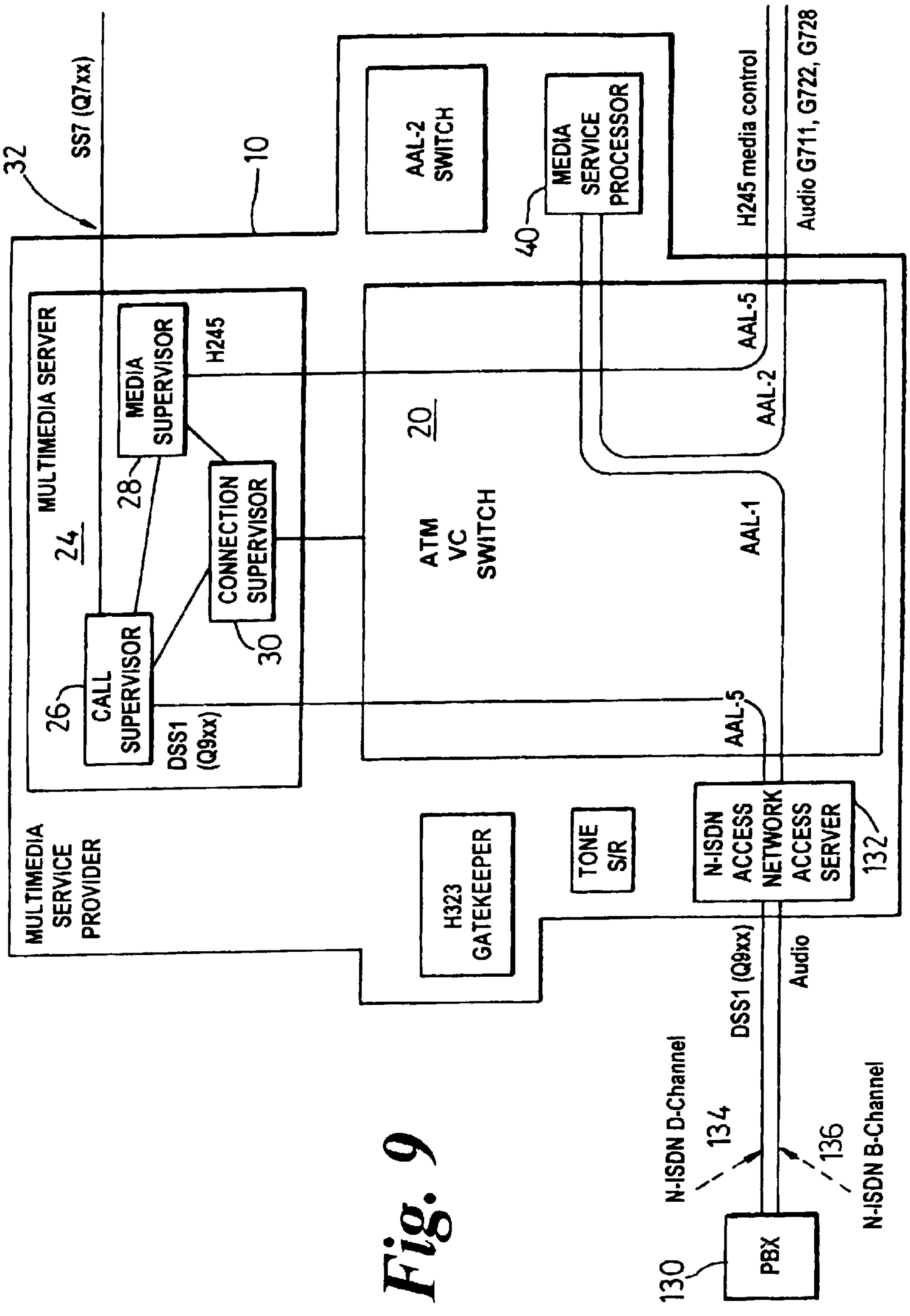
FIG. 9 illustrates a PBX coupled to the service provider of the first embodiment via an N-ISDN line.

This type of communication is illustrated in FIG. 9.

Calls from a PBX via a PSTN/ISDN

PBXs can treat the Multimedia Service Provider as local N-ISDN exchange. This situation is eminently suitable when Users on the PBX wish to call multimedia terminals associated with the Multimedia Service Provider.

In this situation a PBX User 130 will make a normal (external) call in exactly the same manner as to a traditional local exchange.

If desired, and if the PBX 130 has the requisite capabilities, the PBX User can make an H320 call via the Multimedia Service Provider to another multimedia terminal.

N-ISDN Access Network Access Server

This NAS 132 expects calls from a PBX or equivalent to enter it via an N-ISDN Primary Rate Access line, i.e. as a D-channel 134 and set of B-channels 136.

The messages received on the D-channel will be sent to the Call Supervisor 26.

The NAS will search the B-channel information for FAS signals (as per H221). If none are found, the NAS will assume that the call is a simple non-H320 call.

The call's type of transmission can be obtained from the Call Supervisor. The Information Transfer Capability subfield of the Bearer Capability field of the DSS1 Setup message will indicate the type of transmission.

All information received from the N-ISDN B-channels will be converted by the NAS from the N-ISDN streams into ATM packets and vice versa.

The information received from the B-channel will be converted by the NAS from the N-ISDN stream into ATM packets and vice versa. Normally AAL-1 packets will used for speech or 3.1 kHz transmission; AAL-5 might be used for other types of transmission. However, optionally, all could be converted into AAL-1 or AAL-5 or AAL-2 packets.

If when searching for FAS signals, the NAS finds such signals, it will treat the call as an H320 call. It will look for FAS, BAS and C&I signals, and treat the B-channel information in the same manner as for H320 calls from a N-ISDN trunk line.

H310 Trunk Service

Figure 10:
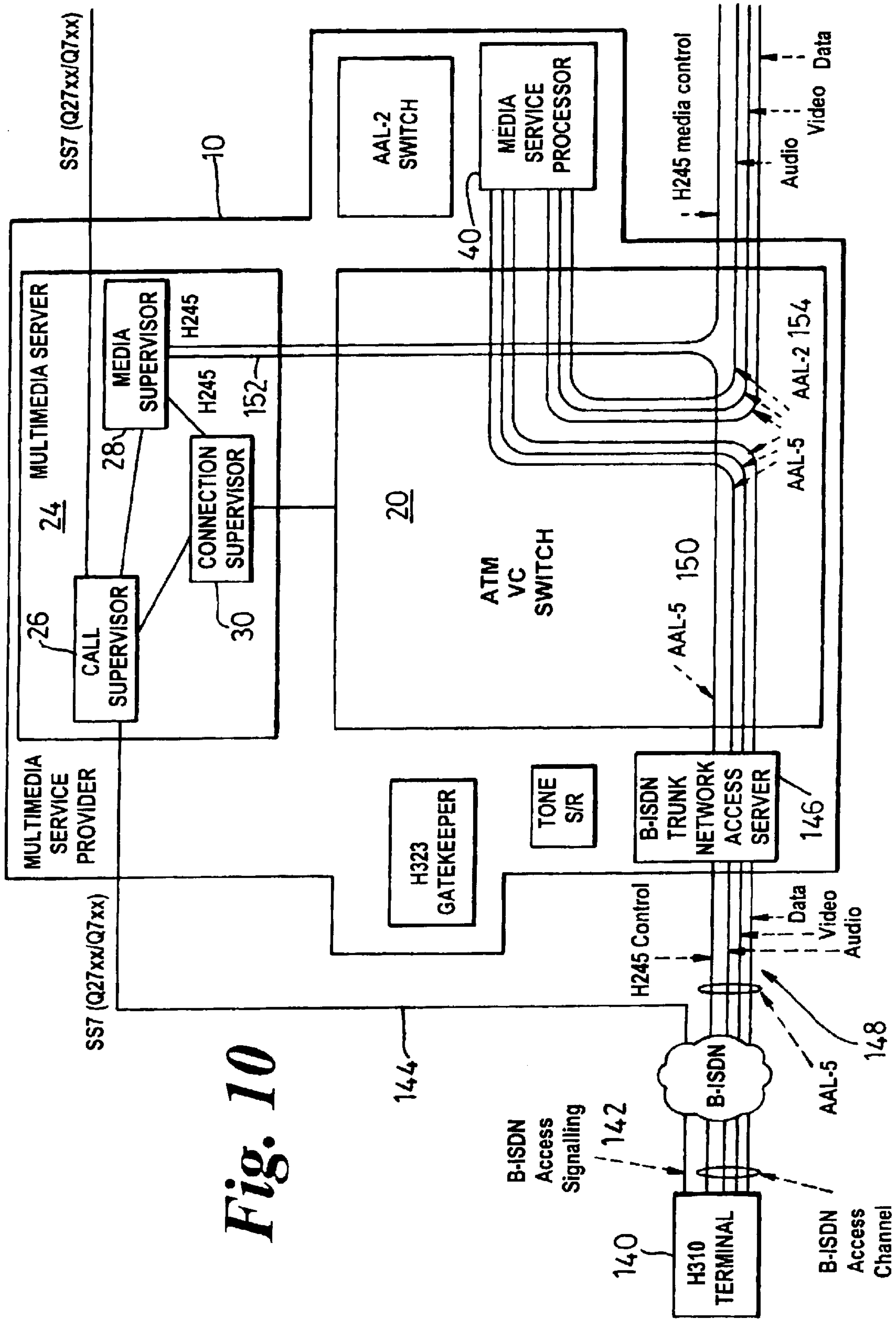
FIG. 10 illustrates an H310 terminal coupled to the service provider of the first embodiment via a B-ISDN exchange.

This type of communication is illustrated in FIG. 10.

H310 Calls via an ISDN

The ISDN exchanges can treat the Multimedia Service Provider as another ISDN exchange.

In this situation, the H310 terminal will make a normal H310 call to a distant H310 terminal or to another type of multimedia terminal, as if there is a B-ISDN end-to-end. If the conventional ISDN exchanges associate the destination with the Multimedia Service Provider then they should route the call via the Multimedia Service Provider treating the latter as an exchange.

The H310 terminal 140 will use DSS2 (Q2931, Q2932, etc.) call signalling messages 142 to set up and release the H310 call.

The B-ISDN exchange will use SS7 for call signalling 144 to and from the Multimedia Service Provider.

The H310 terminal will use the H245 procedures to exchange capability information with the far-end multimedia terminal, and to support the audio, video and/or data streams.

Each H310 call can use any mixture of audio, video and/or data streams.

B-ISDN Trunk Network Access Server

This NAS 146 expects calls from the H310 terminal to enter it via an B-ISDN trunk line 148, i.e. as a B-channel. The associated call signalling 144 will be sent separately (using SS7) and will not be processed by the NAS.

The NAS will search the B-channel information for FAS signals (as per H221). If none are found, the NAS will assume that the call is an H310 call (as opposed to a H321 call). That is, the call will be using H245 messages for controlling the media streams.

All information received from the B-ISDN B-channels will be converted by the NAS from the B-ISDN streams into ATM packets 150 and vice versa.

The H245 control messages 152 normally will be received from the B-ISDN in AAL-5 packets, so will be kept in AAL-5 packets. Similarly, the audio, video and data steams normally will be received in AAL-5 packets, so will be kept in AAL-5 packets.

Optionally, the audio, video and data streams could be converted by the NAS into AAL-2 packets 154 or all streams could be converted into AAL-2 packets. However, if such conversion is desired, it is more likely to be performed by the Media Service Processor 40 as illustrated in FIG. 10.

H321 Trunk Service

Figure 11:
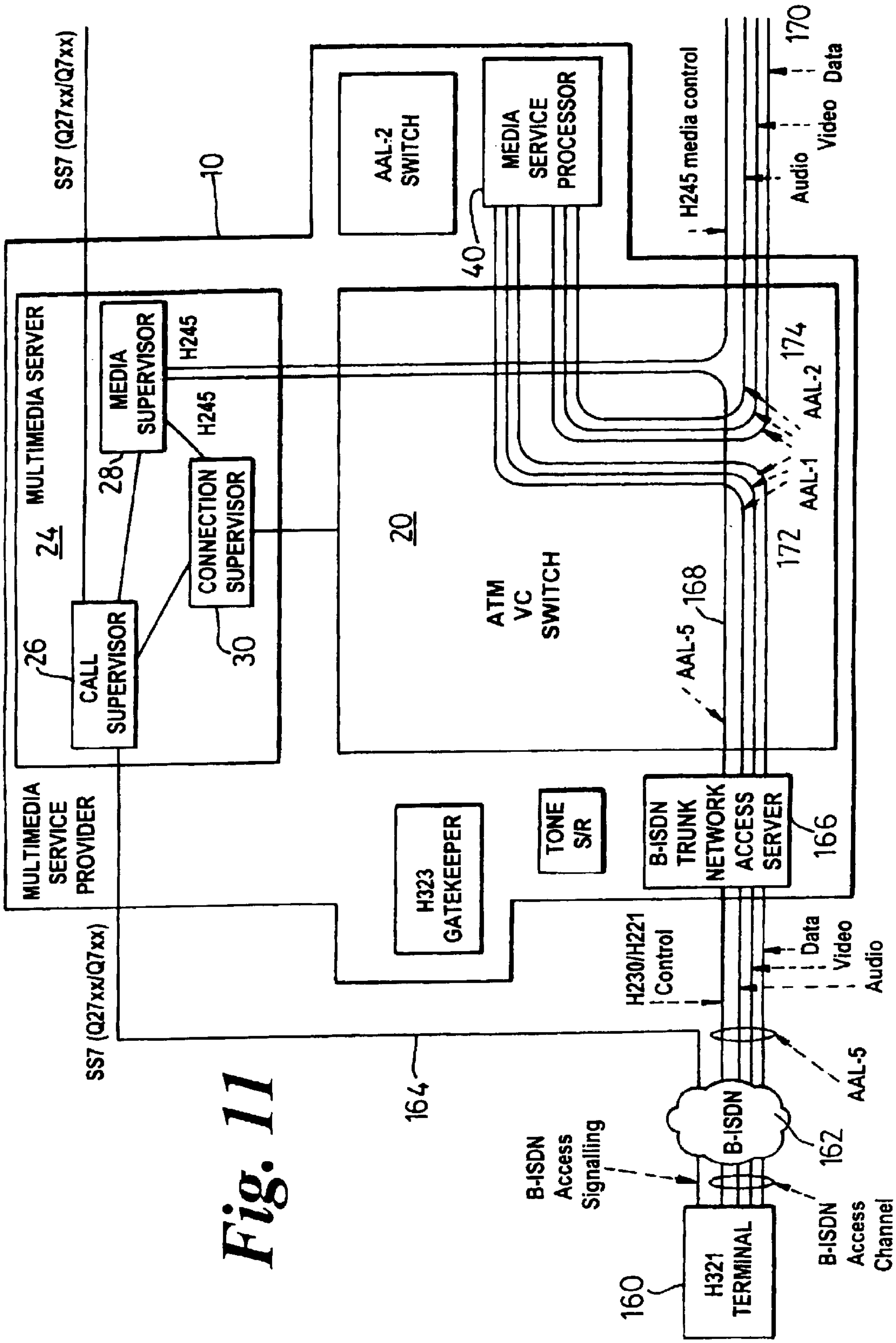
FIG. 11 illustrates-an H321 terminal coupled to the service provider of the first embodiment via a B-ISDN exchange.

This type of communication is illustrated in FIG. 11.

H321 Calls via an ISDN

An ISDN exchange can treat the Multimedia Service Provider as another ISDN exchange.

In this situation, an H321 terminal 160 will make a normal H321 call to a distant H321 terminal or to another type of multimedia terminal, as if there is a B-ISDN end-to-end. If the conventional ISDN exchanges associate the destination with the Multimedia Service Provider then they should route the call via the Multimedia Service Provider treating the latter as an exchange.

The H321 terminal will use DSS2 (Q2931, Q2932, etc.) call signalling messages to set up and release the H321 call.

The B-ISDN 162 exchange will use SS7 for call signalling 164 to and from the Multimedia Service Provider.

The H321 terminal will use the H242/H221/H230 procedures to exchange capability information with the far-end multimedia terminal, and to support the audio, video and/or data streams. These procedures use in-band signals, which steal bits from the B-channels.

B-ISDN Trunk Network Access Server

This NAS 166 expects calls from the H321 terminal to enter it via an B-ISDN trunk line, i.e. as a B-channel. The associated call signalling 164 will be sent separately (using SS7) and will not be processed by the NAS.

The NAS will search the B-channel information for FAS signals, and if found, will extract the FAS, BAS and C&I signals from the B-channels (as per H242/H221/H230 procedures), convert them into H245 control messages 168, and then send them to the Media handler 28. In the opposite direction, the NAS will perform the corresponding opposite functions; i.e. converting H245 messages into the relevant FAS, BAS and C&I signals, and inserting them into the B-channels.

All information received from the B-ISDN B-channels will normally be in AAL-1 packets. For the audio, video and data streams 170, the NAS will extract the FAS & BAS bits and make use of the information in the BAS bits to segregate the audio, video and/or data streams.

The H245 control messages normally will be placed in suitable AAL-5 packets 168. The audio, video and data streams normally will be kept as AAL-1 packets 172.

If a conversion between AAL-1 and either AAL-2 or AAL-5 is desired, then normally this will be done by the Media Service Processor 40, not the NAS. FIG. 11 shows conversion to AAL-2 174.

Call Handling Across the Network

Further aspects of the present invention lie in the structure and operation of the call supervisor, media handler and the connection supervisor and the way in which call across the network are set up and torn down. The following section of the description sets out in more detail the principles by which call may preferably be made across an intermediate network, starting with a discussion of the prior art relevant thereto.

The following section describes the connection of a local area network (LAN) to a distant but similar LAN across a broadband network. In a preferred embodiment the present invention also encompasses the connection of devices, including devices on LANs, of different types across an intermediate network. However, the principles of communication between two service providers across intermediate network are similar whether the user devices coupled to those service providers are of the same or different types.

Prior Art

Figure 12:
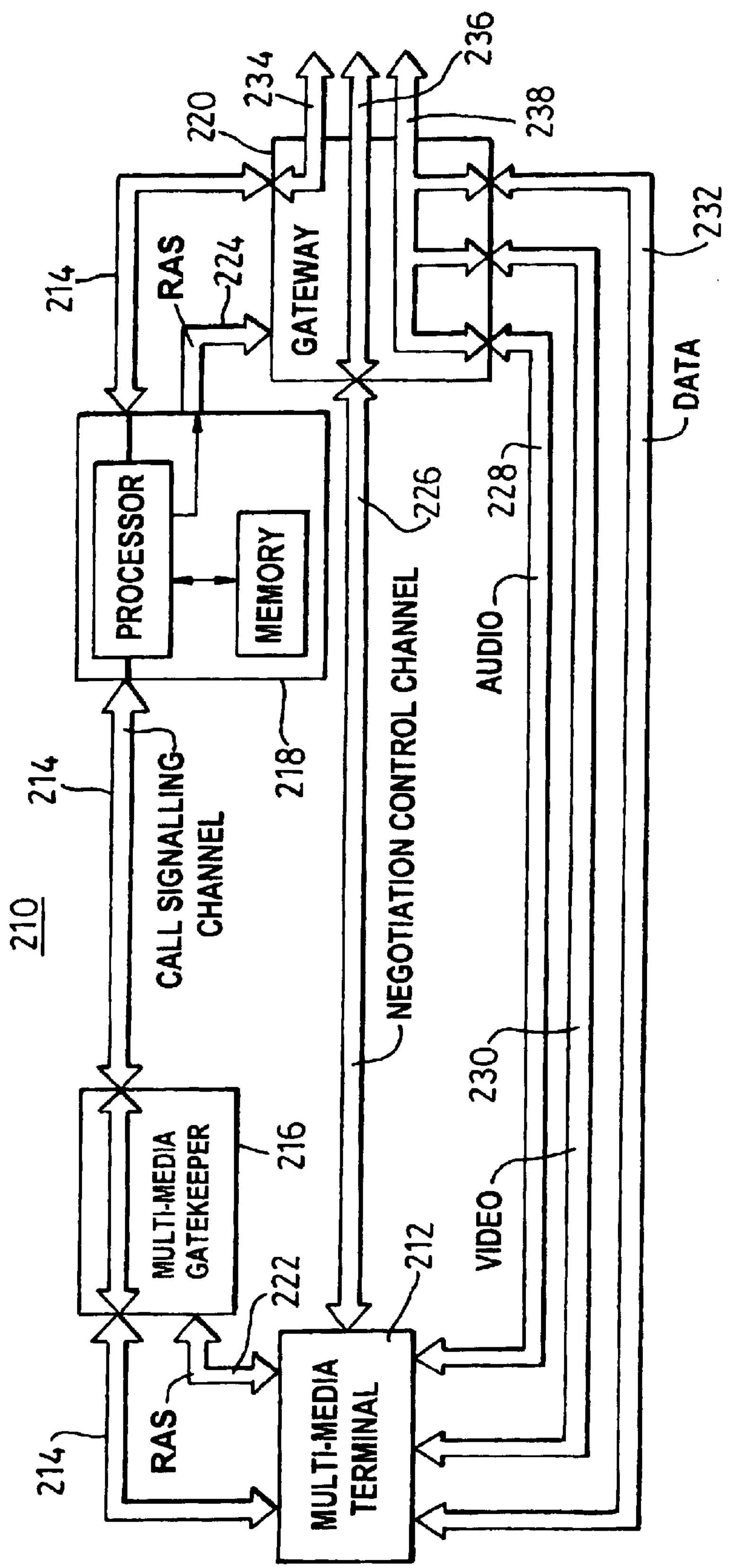
FIG. 12 is a block diagram of a prior art local area network, such as implemented in an H.323 Ethernet architecture.

Referring to FIG. 12, there is shown a block diagram of a prior art local area network (LAN) 210 suitable for supporting an Ethernet connection regime, or the like. The LAN 210, as will be appreciated, operates in a burst fashion and provides packets of data over an H.323 signalling scheme, or similar messaging protocol. As will be understood, the H.323 signalling scheme defines the functionality of the multimedia terminal 212, the signalling protocols utilised within the LAN 210, the types of terminals suitable for use with the LAN 210 and the transmission protocols adopted for use by the multimedia terminal 212. Although, .for the sake of clarity, only a solitary multimedia terminal 212 is shown connected within the LAN 210, it will be appreciated that the LAN 210 can support a multitude of multimedia terminals offering differing levels of functionality to each user thereof.

As will be appreciated, in a LAN environment a limited bandwidth supports numerous packet-based communications that vie for the available bandwidth. When using H.323 protocols over the LAN architecture, port addresses of a first end point are associated with port addresses of a second end point, with the resultant interconnection between pairs of port addresses referred to (generally) as an H.323 channel. In this prior art context, the term “end point” relates to a terminal, a gatekeeper or a gateway (the functions of which will be described later). Each H.323 video or audio channel can be a wideband channel presently supporting data up to a rate of 2Mbps.

As will be understood from the prior art, the multimedia terminal 212 and a multimedia gateway 220 each have unique port addresses through which communication (interconnection) is established. Each port address is typically comprised of the LAN address and a port number, with the LAN address usually common to a specific piece of equipment (i.e. the gateway 220 or a multimedia terminal).

A dedicated call signalling channel 214 couples the multimedia terminal 212 to a first multimedia gatekeeper 216, which first multimedia gatekeeper 216 is, in turn, coupled to a second multimedia gatekeeper 218 through the call signalling channel 14. The second multimedia gatekeeper 218 is further coupled to the multimedia gateway 220 (or “multimedia termination point”, such as a printer) through the call signalling channel 214. Both the first multimedia gatekeeper 216 and the second multimedia gatekeeper 218 are, respectively, coupled to the multimedia terminal 212 and the multimedia gateway 220 via a registration, admission and status (RAS) channel 222–224. The call signalling channel uses the H.323 signalling protocol. In the context of the prior art, the use of either or both gatekeepers is optional and is included for a more complete understanding of a set-up of a H.323 call.

The function of the multimedia gatekeeper, as will be appreciated, is principally to translate LAN addresses into appropriate network addresses, and to negotiate and control bandwidth requirements for a proposed H.323 communication. Specifically, in response to the multimedia terminal 212 generating an alias network address (i.e. not a LAN address, but something like an e-mail address), the gatekeeper operates to translate the alias address into a usable network or LAN address. More particularly, a processor in the gatekeeper will typically access a look-up table (shown only in relation to the second gatekeeper 218 for clarity) to ascertain the usable network or LAN address, whereafter the gatekeeper updates the multimedia terminal 212 with the usable network or LAN address via the RAS 222. The network address is analogous to a telephone number in a conventional telephone system, although the network address may be formulated in such a way that it can address multiple terminals simultaneously.

It will be understood that-the multimedia gatekeepers 216–218 may be co-located with the multimedia terminal 212 and the multimedia gateway 220, and are illustrated as distinct blocks for the sake of explanation. While the LAN is described as having a multimedia gateway 220 (that provides access to different networks having different signalling protocols via a signalling channel resource 234, a control channel resource 236 and channels 238 that support audio, video and/or data), the gateway 220 could be substituted for a second multimedia terminal or a multi-point control unit (namely a conference bridge).

The LAN 210 operates with three principal signalling schemes for each multimedia call. The purpose and function of these schemes will now be described.

Call signalling information is communicated along the call signalling channel 214 and is arranged, principally, to set-up and clear-down calls. Call signalling information generally includes routing information (e.g. the network or LAN address), acknowledge back signalling, connection request/release instructions and input/output port addresses. Assuming that a suitable network address is eventually output from an end point, e.g. multimedia terminal 212, the network address is passed along the call signalling channel 214 and routed via at least the first multimedia gatekeeper 216 (and probably the second multimedia gatekeeper 218) to a receiving end point, e.g. the multimedia gateway 220. More particularly, the network address is typically encoded in a set-up message, as will readily be appreciated, and also identifies the port for the negotiation control channel 226 that the multimedia terminal 12 intends to use. The set-up message, sent from the multimedia terminal 212, causes the receiving unit (in this example, the gateway 220) to respond by sending a port identification and LAN terminal address over the call signalling channel 214. In this way, the receiving unit (in this case the multimedia gateway 220) identifies to the multimedia terminal 212 which port the receiving unit intends to use for the negotiation control channel 226. As such, both the requesting multimedia terminal 212 and the called party each possess an address of a port to which communications on the LAN 210 are to be directed.

Once an understanding (in-terms of port usage) has been established between parties that are to participate in the communication, the call signalling channel 214 is used to administer overall system control, while the negotiation control channel 226 (established between the identified port addresses) is used for two principal purposes. First, the negotiation control channel 226 is used to communicate in-call channel information, such as timing information, channel frequency information, data rates and bandwidth allocations. Secondly, the negotiation control channel 226 is used to identify the port addresses (at all terminals) and to control transmissions on the audio stream 228, video stream 230 and data stream 232. The negotiation control channel 226 may utilise H.245 signalling or the like.

Figure 13:
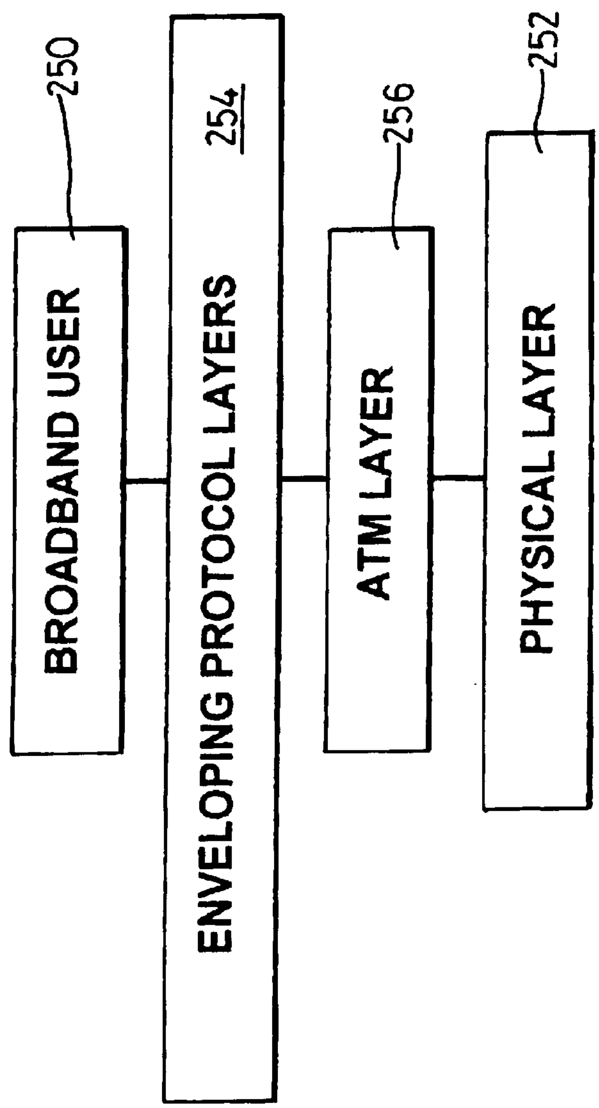
FIG. 13 illustrates the concept of an architectural stack, typically employed within a prior art broadband network.

In an alternative prior art system, namely a broadband network, it will be appreciated that, conceptually, the systems architecture can be considered to comprise discrete architectural layers; this is illustrated in detail in FIG. 13. Specifically, broadband networks, such as those which utilise ATM, are derived from circuit switched telephony and so typically exhibit several intermediate signalling layers between a broadband user 250 and a physical infrastructure layer 252. More particularly, there is usually at least one intermediate enveloping protocol layer 254 juxtaposed to the broadband user 250, while an ATM (packet-switched) signalling protocol layer 256 is sandwiched between the physical infrastructure layer 252 and the enveloping protocol layer 254. Consequently, user information provided by the broadband user 250 is first packaged into defined protocol envelopes (by the enveloping protocol layer 254), which envelopes are then compressed into a packet-switched format by the ATM signalling protocol layer 256. Once fully packaged, information can be transmitted across the broadband network through the physical layer 252.

Therefore, unlike narrowband networks, i.e. circuit-switched communications having a fixed amount of bandwidth per channel, that provide a continuous transmission of information (even in the context of time-division-multiplexed communication), a broadband network utilises a transfer protocol in which virtual channels are circuit switched and which provides a provisioned (but varying) bandwidth. Broadband networks can utilise ATM and AAL-2 (ATM Adaptation Layer 2); the latter is a subset of ATM that provides switching at a virtual sub-channel level in an ATM environment. Other protocols used within ATM include AAL-1 and AAL-5. AAL-1 is an ATM adaptation protocol originally targeted at constant bit rate (CBR) traffic, e.g. voice or video, and is applicable to data rates equal to or exceeding sixty-four kbps. AAL-5 provides a capability of data, voice and video transmissions to work stations, and is therefore particularly applicable to multimedia communication systems. AAL-5 segments long data structures into many cells, with a data structure conceivably exceeding fifteen hundred octets in length.

Figure 14:
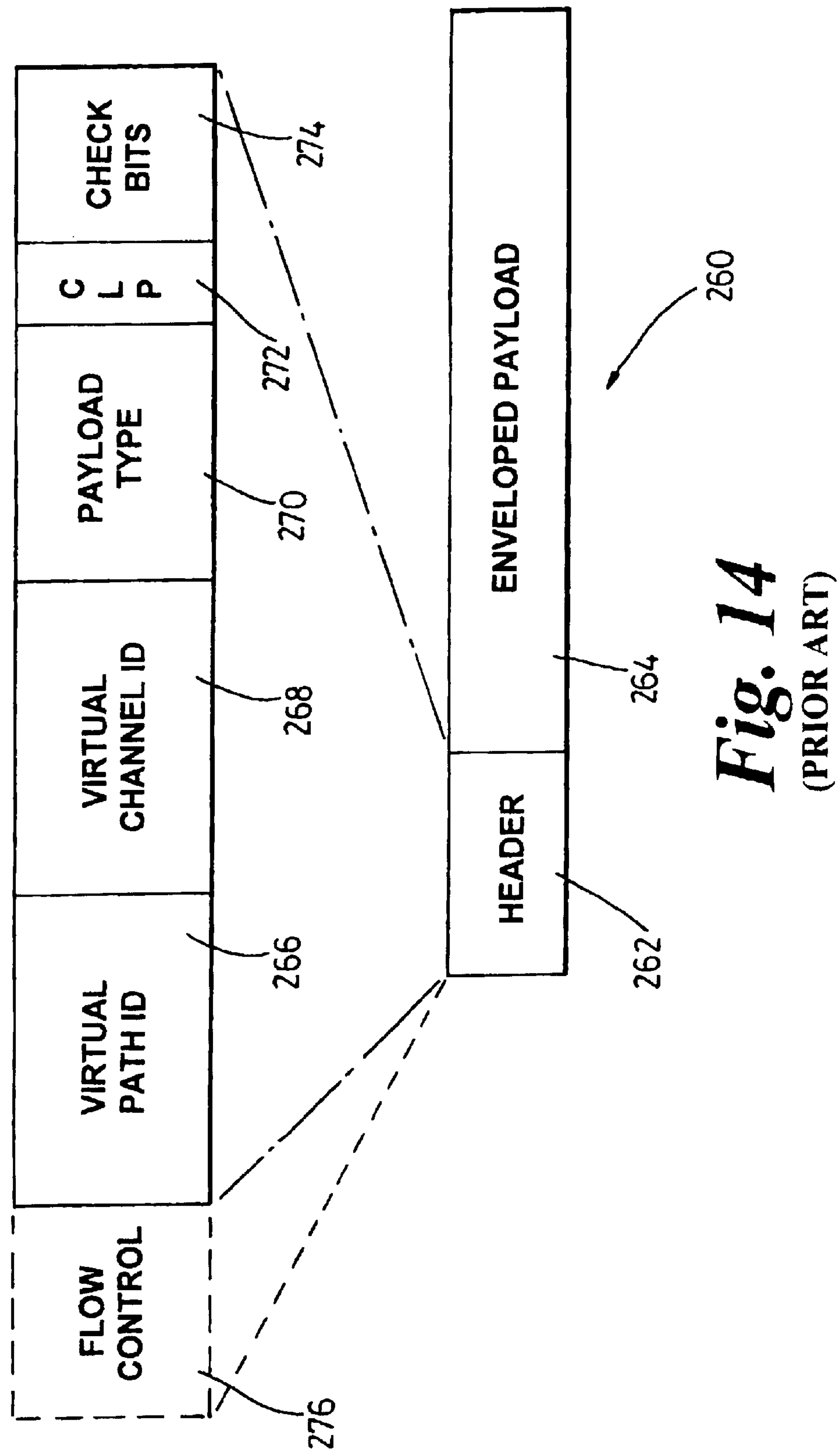
FIG. 14 illustrates a data frame structure for a prior art ATM network.

Turning now to FIG. 14, there is shown basic cell frame structure 260 of a prior art broadband network. For the purpose of explanation, if we now consider the data frame structure 260 as being suitable for ATM transmission, the data frame structure 260 comprises a header 262 of control information and an enveloped payload 264. The header 262 comprises a virtual path identifier 266 and a virtual channel identifier 268 that together co-operate to identify a circuit-switched path (i.e. a virtual channel) through the broadband network. The circuit-switched path is therefore set at the beginning of a call and only released at the end of the call. The header 262 further includes an indication of payload type 270, and an indication termed cell loss priority 272 that stipulates whether the communication on the virtual channel can be dropped to support higher priority communications. As will be appreciated, there is a finite amount of capacity offered by the broadband network and so it may occasionally be necessary to consider the voluntary release of channel resources. Finally, the header 262 includes check-bits for error detection and correction, although the header 262 may optionally include dedicated flow control bits 276 used in quasi-broadband systems to enhance data rate capacity over existing communication resources, e.g. by superimposing high frequency channels over an existing two-wire scheme. More particularly, the generic flow control bits act as negotiation bits and request the assignment of bandwidth, for example, from a system controller (not shown).

Use of this form of packet-switched structure therefore allows interleaving of packets across a shared physical resource, albeit that a virtual channel used for the communication is unique to that communication. The enveloped payload 264, which is of fixed length, will now be described in more detail in relation to FIG. 15 in which there is shown a typical mechanism by which data is "nested" within the payload envelope 264 of FIG. 14. Particularly, data that is ultimately to be nested within the payload envelope 264 can vary in length, and can be comprised from distinct data portions. Indeed, a combination of the individual data portions can produce a data string having an overall length that exceeds the length of the payload envelope 264. Consequently, the data may be encoded using known techniques so as to optimise nesting of the data into the payload envelope 264.

In relation to an AAL-2 protocol data unit (PDU) 280, data 282 is preceded by a start-field octet 284 comprising an offset field 286, a sequence number 288 and parity bit 290. Alternatively, with respect to an AAL-2 service data unit (SDU) 292, the data 282 (which, in this instance; usually varies in length) is preceded by a packet header 294 comprising a channel identifier 296, a length indicator 298, a user-to-user indication 300 and check bits 302. The channel identifier 296 identifies a "mini-channel" that uniquely supports a solitary communication. As such, more than one mini-channel can be nested or interleaved within a single enveloped ATM cell payload 264 of FIG. 14. The length indicator 298 identifies the length of the data portion. The functions of the constituent parts of the packet header 294 are detailed in ITU standards document I.363.2

Figure 15:
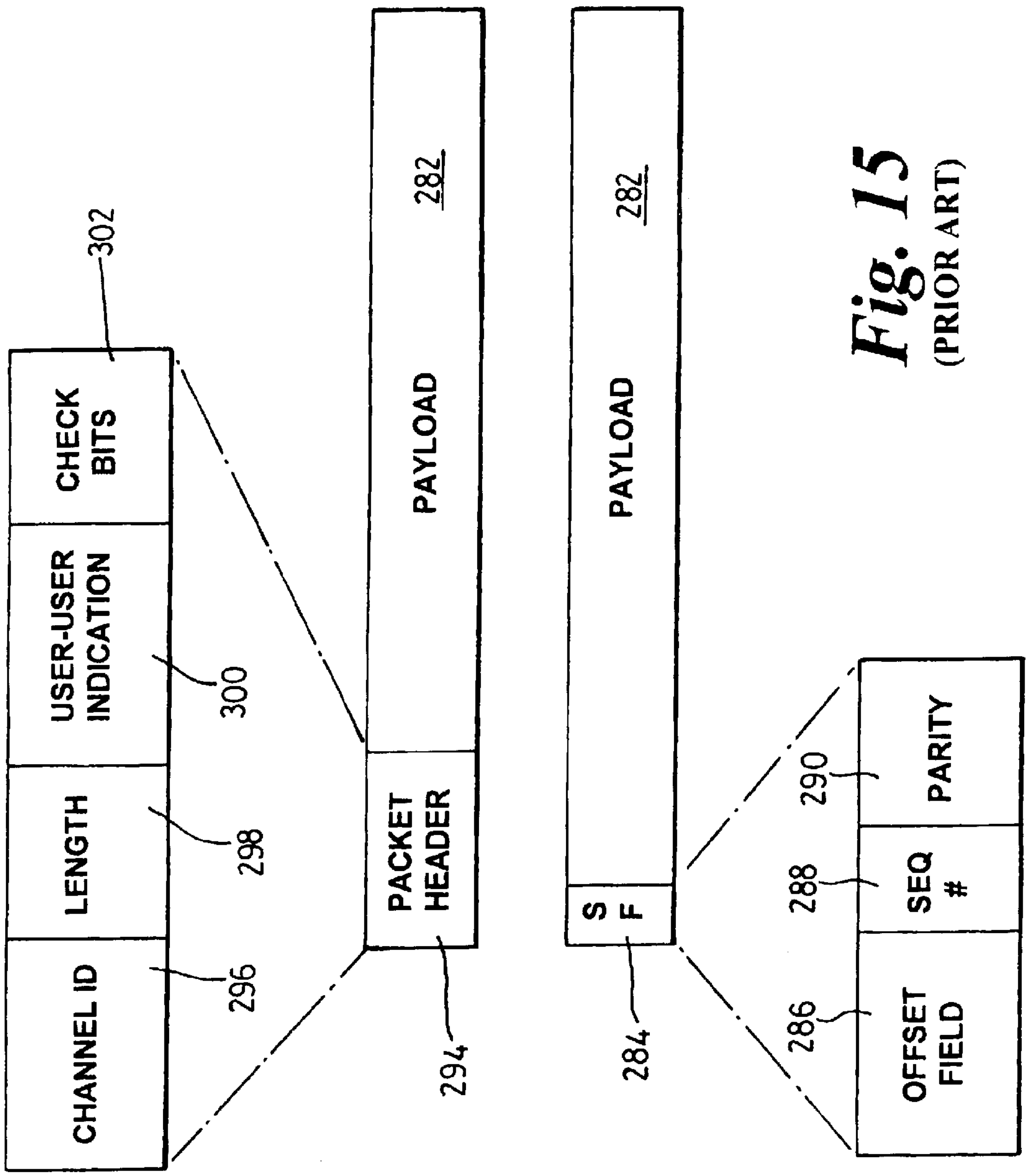
FIG. 15 illustrates a typical frame arrangement used for enveloping data into the data frame structure of FIG. 14.

As will now be appreciated, the exemplary combination of FIGS. 14 and 15 demonstrate the stack concept illustrated in FIG. 13. The PDU and SDU layers for AAL-1 and AAL-5 vary from the structure of AAL-2, but both form stacks within ATM in a similar fashion to that described above, as will be readily appreciated.

Further embodiments of the Invention

Figure 16:
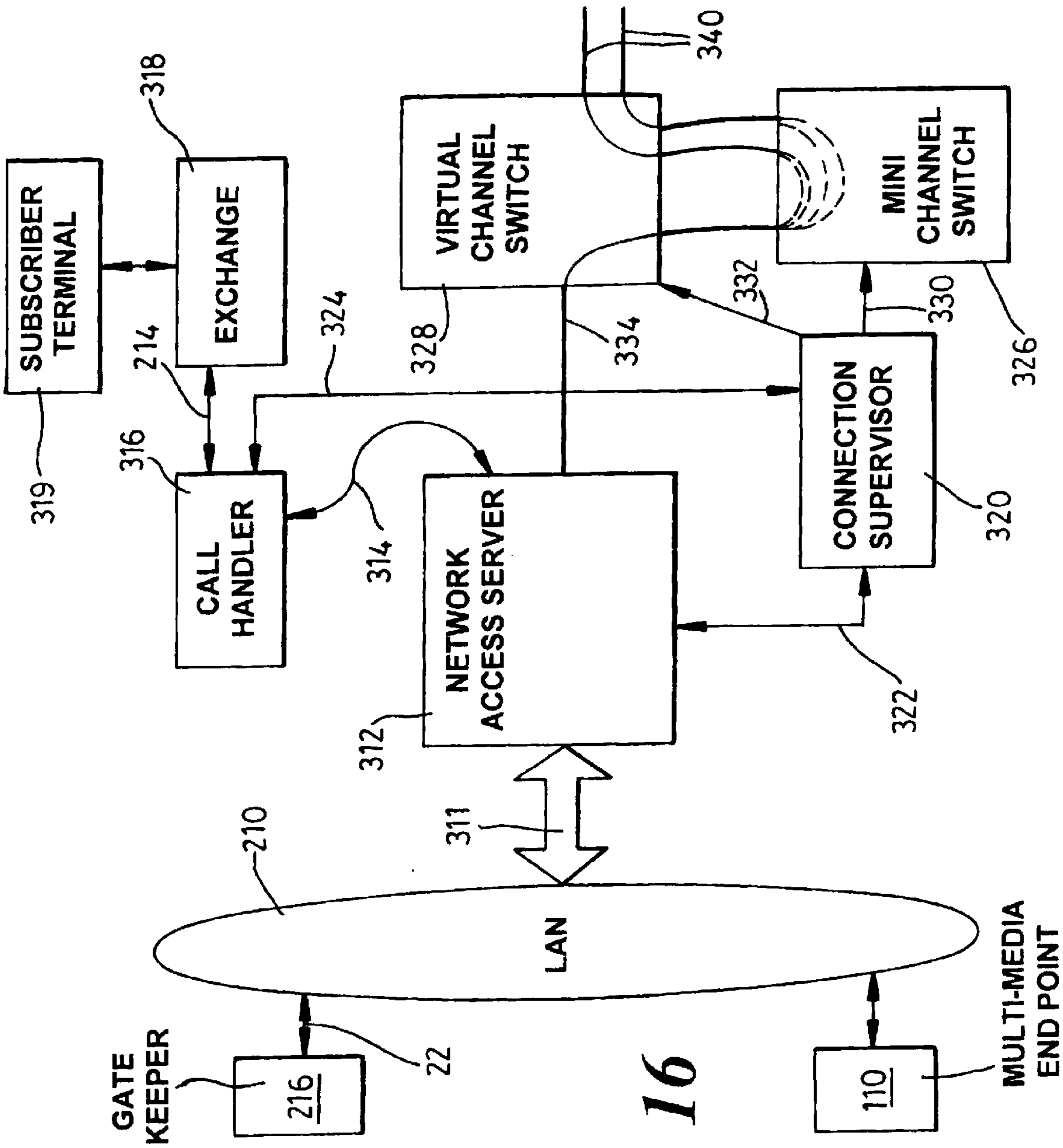
FIG. 16 is a block diagram of an integrated system architecture, according to a further embodiment of the present invention, for an interconnected broadband-LAN environment.

Referring now to FIG. 16, a further embodiment of the present invention is shown. The embodiment provides a mechanism for the interconnection of a LAN to a broadband network, perhaps implemented using ATM. In relation to the figure, elements common with the prior art contain identical reference numerals to those of the FIGS. 12 and 13.

The LAN 210, as previously described, provides a capability of interconnecting communication devices (i.e. multimedia endpoints 310), such as computers (having Internet capabilities) and multimedia terminals 212 and other multimedia devices. As in a conventional system, the LAN 210 may also support a gatekeeper 216. It will be appreciated that a communication resource 311, coupled to a network access server (NAS) 312, supports the transmission of RAS bits and provides a dedicated call signalling channel, a dedicated negotiation control channel and audio, video and data streams (as previously described and shown in relation to FIG. 13, albeit not specifically shown in this figure).

The NAS 312 couples call signalling messages 314 to a call supervisor 316, typically arranged to support an integrated service digital network (ISDN) methodology (either narrowband, broadband or a hybrid). The call signalling messages 314 are used to set-up and clear-down calls, and are also used to identify multimedia terminal addresses and the like. The call supervisor 316 is, in turn, coupled to a succession of other exchanges 318 through a semi-permanent call signalling channel 315. At least one subscriber terminal 319 is coupled to each other exchange, with the subscriber terminal 319 having a unique address. The connection supervisor 320 is connected through a control line 324 to the call supervisor 316.

The connection supervisor 320 is arranged to supervise the control of both a mini-channel switch 326 and a virtual channel switch 328 via control lines 330 and 332, respectively. It will be appreciated that the functionally of the connection supervisor 320 in FIG. 16 does not correspond precisely to that of the connection handler 30 in FIGS. 3 to 11, but also incorporates functionality of the media handler 28. The virtual channel switch 328 is coupled to the NAS 312 via a first virtual channel resource 334 supporting (in the exemplary context of AAL-2) enveloped mini-channel payloads, e.g. H.245 negotiation control messages, and audio, video or data packets. Before providing an output on a second channel resource 340, the virtual channel switch 328 routes the payloads received on the first virtual channel resource 334 through the mini-channel switch 326, which is arranged to optimise call transmissions ultimately output by the virtual channel switch 328 on the second virtual channel resource 340. The second virtual channel resource 340 leads to the other exchange 318.

The connection supervisor 320 provides a dual function. First, it acts to control the virtual channel switch 328 (via control line 332), and the mini-channel switch 326 (via control line 330). Second, the connection supervisor 320 also functions to receive, process and generate H.245 messages for H.323 calls. In this latter respect, H.245 messages are routed between the first virtual channel resource 334 and the connection supervisor 320 and also between the connection supervisor 320 and the second virtual channel resource 340, with both routings being via the virtual channel switch 328 and the mini-channel switch 326.

The NAS 312, the call supervisor 316, the connection supervisor 320, the virtual channel switch 328 and the mini-channel switch 326 constitute parts of an exchange (or node) 342.

The present embodiment also has application in relation to AAL-1 and AAL-5, which operational embodiments will be described in more detail later. However, to support hybrid working between AAL-1, AAL-2 and AAL-5 the exchange 342 further includes a protocol interworking processor 344 that translates between AAL-1, AAL-2 and AAL-5. This protocol interworking processor 344 is coupled to the virtual channel switch 328. The protocol interworking processor 344 is operationally responsive to the connection supervisor 320 (via control line 345). One will appreciate that the mini-channel switch 326 is not required in relation to AAL-1 and AAL-5 specific calls. H.245 messages carried on AAL-5 instead of AAL-2 are routed solely through the virtual channel switch and through the connection supervisor; this connection is not shown for the sake of clarity of FIG. 16.

Figure 17:
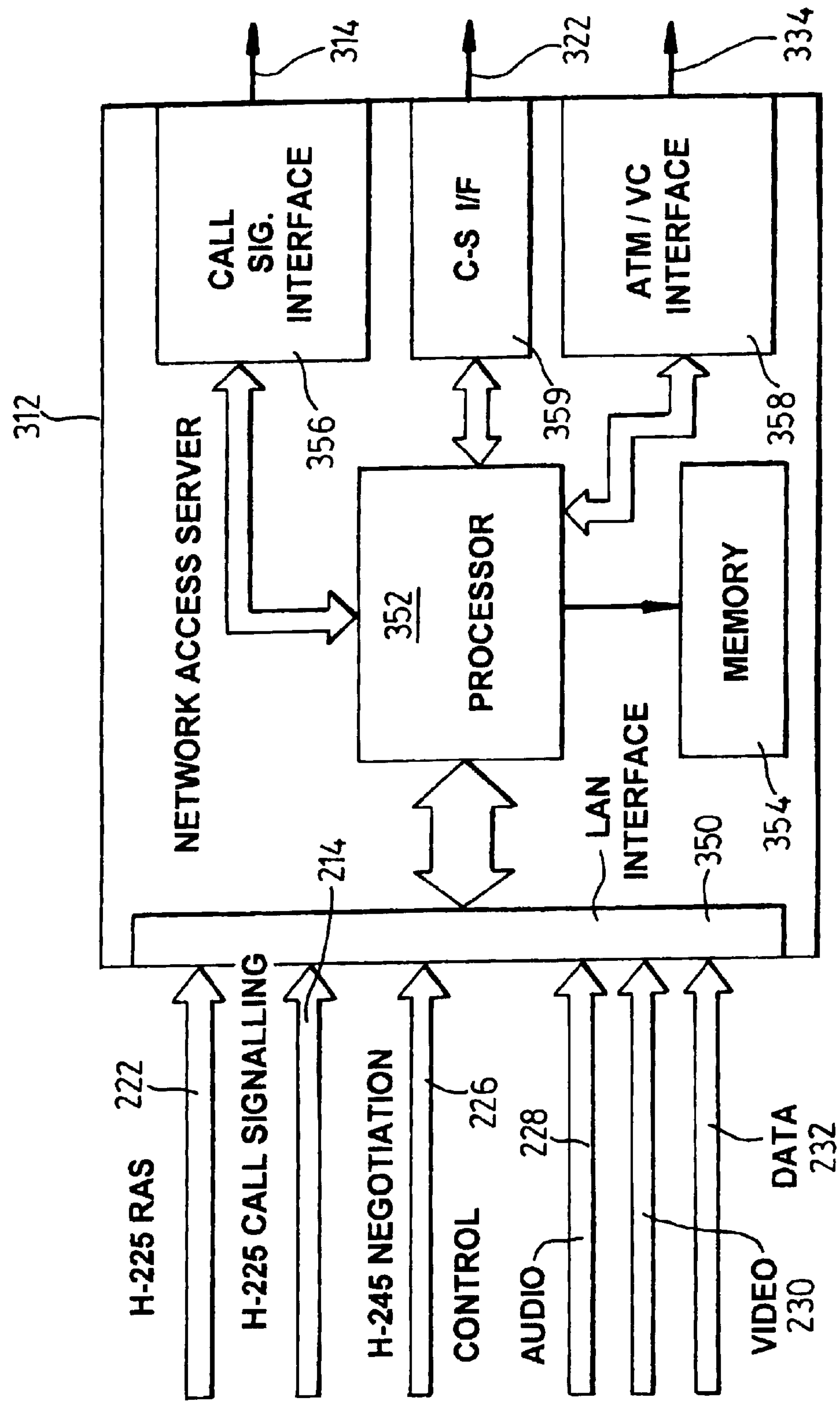
FIG. 17 represents a block diagram of a NAS of FIG. 16, the NAS constructed according to the further embodiment of the present invention.

FIG. 17 illustrates the structure of the NAS 312 in greater detail and also according to a preferred embodiment of the present invention. The NAS 312 is responsive to a LAN 210 and receives, at LAN interface 350, an H.225.0 RAS control channel 222, an H.225.0 call signalling channel 214, an H.245 negotiation control channel 226 and audio streams 228, video streams 230 and data streams 232. A processor 352, coupled to a memory device 354, controls the routing of the various input channels and streams (applied to the LAN interface 350) to appropriate output interfaces.

A call signalling interface 356 receives a translated version of signalling messages received on the H.225 call signalling channel 214, i.e. the processor 352 and memory device 354 co-operate to translate incoming call signalling messages into an acceptable broadband format, such as DSS1/DSS2, for onward routing (via the control signalling channel 314) to the call supervisor 316. The processor 352 also packages control messages (received on the negotiation control channel 226) and information (received on the audio, video and data streams 228–232) into a mini-channel format suitable for use in the broadband network. This mini-channel format is output through a broadband ATM/virtual channel interface 358 to the first virtual channel resource 334.

As will now be appreciated, the memory device 354 acts as a storage medium for temporarily storing information passing between the LAN and a broadband network, and also contains look-up tables associated with address and routing information, active call and connection information, and signalling protocol translation schemes used to translate LAN signalling to narrowband/broadband signalling. When communications between devices using different protocols is involved, the look-up tables also contain information regarding conversions between protocols.

Operation of the architecture of this embodiment of the present invention will now be described with particular regard to FIG. 18. In response to receiving conventional LAN streams from the call signalling channel 214 (step 400 of FIG. 7), the NAS 312 first converts call signalling information (received on the call signalling channel 214) into an appropriate format, such as DSS1, and forwards this onward to the call supervisor 316. More particularly, as will now be understood, the call signalling information contains an address of a called party (normally as a telephone number, although an E-mail address can also be used) and an identity (e.g. a telephone number and/or E-mail address) of a requesting multimedia terminal. As such, it might be necessary to translate (at least) the address of the called party into a format acceptable to the broadband network (step 402). In other words, it may be necessary to generate a telephone number for use in the broadband network.

This address mapping process can be executed within the call supervisor 316 or within the NAS 312, after which the communication system begins to establish a connection. As a consequence of this procedure, data received by the NAS 312 (by way of the audio, video and data streams 228–232 and the negotiation control channel 226) will typically need to be stored, temporarily, in memory 354. As will be appreciated, in a multimedia call, the LAN streams can be considered as forming distinct traffic components in the call.

Using the telephone number of the called party, the call supervisor selects an outgoing route, i.e. the next exchange 318, and a trunk circuit leading to that next exchange (step 404). The connection supervisor 320 is then notified of the selected trunk circuit. Optionally, the call supervisor can send an SS7 IAM to the next exchange 318 (via the call signalling channel 315), but there is an associated risk because, at this time, there is no guarantee that a successful path can be set up across exchange 342. In the event that an IAM is sent, then the relevant next exchange 318 then responds to the call supervisor 316 and identifies/confirms the address identity or identities that, respectively, has or have been ear-marked for the call; this mechanism is therefore analogous to the prior art procedure described in-relation to FIG. 12. The call supervisor 316 sends the identity of a selected trunk circuit to the connection supervisor 320 which in turn makes the connections across the virtual channel switch 328 and mini-channel switch 326 (as appropriate) to connect the H.245 control channel on the first virtual channel resource 334 to the connection handler 320 and then onto the second virtual channel resource 340 (step 406). In this respect, the call supervisor is under the impression that it is setting up a whole trunk call whereas, in fact, the call supervisor 316 is only setting up the H.245 negotiation control channel.

As a brief re-cap, the calling party dials the number of the called party and, in response thereto, the call supervisor 316 analyses the called number and selects out-going route (based on the called number) to next exchange 318. Preferably, the call supervisor 316 selects a trunk circuit belonging to the out-going route, although this function may be performed by the connection supervisor 320. Rather than asking the virtual channel switch 328 to set-up media paths for the call, the call supervisor 316 then asks connection supervisor 320 to set-up the call.

Step 406 is now described in more detail. The connection supervisor 320 interacts with the NAS 312, the virtual channel switch 328 and the mini-channel switch 326 to orchestrate a broadband connection. A first step requires the selection of a first mini-channel of the first virtual channel resource 334, which mini-channel is incident to the NAS-312. Preferably, the connection supervisor 320 makes the selection of the first mini-channel. A first connection is-made (through use of control channels 330–332) between the NAS 312 and the connection supervisor 320, which connection uses the first mini-channel and is made via the virtual channel switch 328 and the mini-channel switch 326. The connection supervisor then uses the trunk circuit identity (received from the call supervisor 316) to select a virtual channel and a second mini-channel from the available virtual channels of the second virtual channel resource 340. A second connection is then made between the connection supervisor 320 and the other exchange 318 using the selected virtual channel and the second mini-channel via the virtual channel switch 328 and the mini-channel switch 326. The connection supervisor 320 associates the first mini-channel and the second mini-channel with each other and the H.323 call.

At step 408, the call supervisor 316 sends a signalling message over the call signalling channel 315 to provide details of the set-up to the next exchange 318. In the preferred embodiment, the signalling message is an SS7 IAM containing the selected trunk circuit identity, the virtual channel identity and the mini-channel identity; the latter two are within the user-to-user field. The call supervisor 316 should receive from the next exchange 318 a message confirming the trunk circuit identity, etc. However, if an IAM was sent during step 404 (and hence did not include the virtual channel identity and mini-channel identity), then the virtual channel identity and the mini-channel identity must now be sent within a SS7 user-to-user information message.

The initial communication with the next exchange can actually be performed within step 404 or within step 408; the latter is a safer mechanism because the path has been established to the next exchange at this point.

The connection supervisor 320 instructs the NAS 312 to launch any previously stored H.245 control messages (received on the negotiation control channel 226) to the first mini-channel that has just been set up.

Specifically, the stored control messages are formatted into packets and cells as required by the mini-channels, and then placed on the ATM virtual channel 334 for transmission to the connection supervisor (step 410 of FIG. 18) and then onto the next exchange 318 via the second mini-channel. Furthermore, using H.245, the end points (in this case multimedia terminal 310 and subscriber terminal 319) exchange control messages via the connection supervisor 320 to ascertain a common functional capability regarding audio, video and data.

The call supervisor 316 is now under the impression that the call set-up has been completed.

The next stage is to set up the required audio, video and/or data paths. Typically (but not necessarily), all mini-channels for the same H.323 call reside within a single virtual channel. In relation to each required path, the following applies.

In step 412, the calling unit that initiated the call set-up (i.e. the multimedia end point 310 in this example) now sends an H.245 control message to the exchange 342, which message is actually relayed to the connection supervisor 320. The connection supervisor 320 assimilates the information contained in the H.245 control message and sets up a path between the NAS 312 and the next exchange 318. To accomplish such a path, the connection supervisor 320 selects: i) a third mini-channel of the first virtual channel resource 334; and ii) a fourth mini-channel of the second virtual channel resource 340. The connection supervisor 320 then connects the third min-channel and the fourth mini-channel together via the virtual channel switch 328 and the mini-channel switch 326. The connection supervisor 320 generates relevant H.245 control messages and sends them to the next exchange 318. Upon receipt of H.245 control messages from the next exchange 318, the connection supervisor 320 sends the corresponding H.245 control messages back to the NAS 312 for transmission back to the multimedia end-point 310.

The process described above must be repeated for every audio, video or data path required.

The NAS 312 now operates to encode any stored traffic (obtained from the audio, video and data streams) into mini-channels that are then communicated to the next exchange 318 and ultimately (in an appropriate form) to the subscriber terminal 319. As will be understood, the initiating end-point may start to transmit information before the exchange 342 (as a whole) is quite ready. Therefore, buffering is usually provided within the NAS 312.

Figure 18:
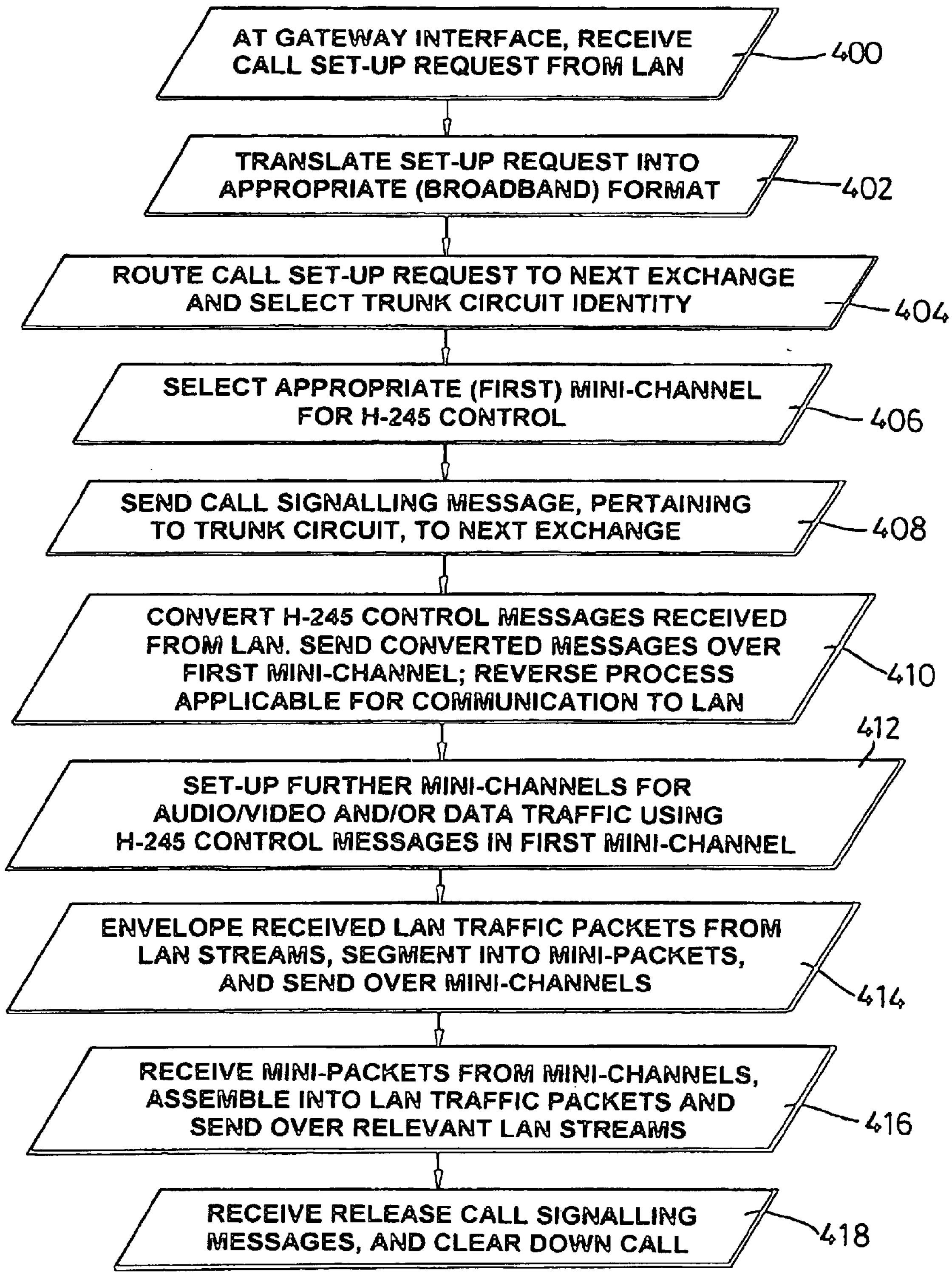
FIG. 18 is a flow diagram illustrating how, in accordance with a method of the present invention, call set-up is established within the system of FIG. 16.

At step 414 of FIG. 18, audio, video and/or data transmission can now occur over the assigned mini-channels set up for these purposes. In relation to the LAN streams, LAN traffic packets from the respective streams must be segmented (i.e. sized and labelled with a header) into mini-packets (e.g. AAL-2 packets). In the reverse direction, mini-packets are re-assembled to form LAN packets for the respective LAN streams (step 416).

The set-up of the H.323 call is now complete.

There are numerous ways of clearing down the H.323 call. It is possible to have a partial clear-down in which audio, video or data paths are individually cleared down. To do this, an H245 control message is sent to the connection supervisor 320 that reacts by clearing down the relevant mini-channels. Alternatively, the whole call can be released by sending a release message over the call signalling channel 314 or 315 to the call supervisor 316. The call supervisor is unable to clear down the call itself and must therefore solicit the assistance of the connection supervisor 320 to clear down all mini-channels related to the H.323 call. The mechanism is, however, dependent upon the direction from which clear down is initiated. Specifically; different signalling systems exist between: the call supervisor 316 and the NAS (e.g. DSS1 or DSS2); and the call supervisor 316 and the next exchange 318 (e.g. signalling system-no. 7 (SS7)).

In relation to the operation of the mini-channel switch 326, the connection supervisor 320 is responsible for associating the input and output ports of the mini-channel switch 326 and therefore accordingly notifies the mini-channel switch 326.

To describe the embodiment is a different but complementary way, one can consider the following. Call signalling is used to set-up and clear-down an H.245 control channel applied to the NAS 312. On the LAN 210, call signalling is achieved using H.323 (H.225) call signalling messages; while DSS1/DSS2 signalling messages are utilised in the narrowband/broadband access network, and SS7 N-ISUP/B-ISUP signalling messages are used for call signalling in the narrowband/broadband trunk network. On the LAN 210, routing of the H.323 call can be based upon transport addresses, telephone numbers (as per E-364) or E-mail addresses, while the call supervisor 316 bases its routing upon telephone numbers. Also, on the LAN 210 and where appropriate, the relevant infrastructure and subscriber entities know the transport address of each end of the H.245 control channel, whereas a relevant call supervisor in the access network knows the access circuit identity for the H.323 call. In the trunk network, the relevant call supervisor knows the trunk circuit identity used for the H.323 call.

In other words, the call supervisor 316 has been hoodwinked in the present embodiment into believing that the NAS 312 is a subscriber and hence operating within its access network. The call supervisor 316 believes that the next exchange 318 is connected to its trunk network (either narrowband or broadband).

When the call supervisor 316 sets up an H.323 call, the call supervisor 316 believes that the whole call has been established while, in fact, only the H.245 control channel has been set up. In the system of the present embodiment, no call supervisor or call signalling message knows the identity of any audio, video or data channel.

An outgoing call from the LAN 210 will be established on the following basis. The first significant event occurs when the call supervisor 316 receives a DSS1/DDS2 set-up message from the NAS 312. In response thereto, the call supervisor 316 performs digit analysis (of the called telephone number) and then selects an outgoing route (and hence a next exchange) while also selecting a trunk circuit within the outgoing route. The outgoing route must be selected before any inter-exchange virtual channel can be selected. The connection supervisor 320 obtains the outgoing trunk circuit identity from the call supervisor 316 and then selects and sets up associated virtual channels and mini-channels on which control messages will be sent and received.

In relation to the bandwidth of an outgoing call, a bearer capability field in the H.323 call signalling set-up message, received from the LAN 210, indicates the required bandwidth for the call. This bandwidth indication is then used by the connection supervisor 320 to select a virtual channel of appropriate bandwidth between the NAS 312 and the virtual channel switch 328. Usually, subsequent virtual channels used for the H.323 call will have the same bandwidth.

For an incoming call, the call supervisor 316 receives, from an interconnected exchange 318, an SS7 N-ISUP/B-ISUP IAM message on the call signalling channel 315. This message contains a trunk circuit identity associated with an H.245 control mini-channel. The IAM message also includes, within its user-to-user field, an indication of which mini-channel in which incoming virtual channel (used to relay H.245 control messages) corresponds to the above mentioned trunk circuit identity; this indication is utilised by the connection supervisor 320 to identify the appropriate virtual channels and mini-channels. The call supervisor 316 asks the connection supervisor 320 to set up a single 64 kbps circuit (in the narrowband case), i.e. the circuit required for use as the H.245 control channel. Note that, in a preferred embodiment, the connection supervisor is arranged to set up an appropriate virtual channel and mini-channel leading to the NAS 312, rather than a 64 kbps circuit. In relation to bandwidth allocation for an incoming call, the true required bandwidth will be obtained from the user-to-user field of the IAM message. The connection supervisor then uses this bandwidth to set-up the appropriate virtual channel.

In relation to point-to-multi-point communication (which is supported by H.323), the connection supervisor 320 is arranged to consolidate separate calls (that would otherwise be supported on separate and distinct virtual channels) through a conference bridge connected to the mini-channel switch 326.

In summary, therefore, once the relevant end-point (or terminal) identities (e.g. telephone numbers, E-mail addresses, etc.) and address identities (e.g. trunk circuit identity and virtual channel plus mini-channel identities) have been exchanged between the NAS 312 and the exchange 318, a first AAL-2 mini-channel is used as a control (signalling) channel, and this first mini-channel then controls the setting up and clearing down of other AAL-2 mini-channels which support the same H.323 multimedia call between the multimedia endpoint 310 (of the LAN 210) and the subscriber terminal 319. In other words, H.323 LAN streams are converted into AAL-2 mini-channels by the NAS 312, and then carried on a virtual channel which is itself controlled by an AAL-2 mini-channel using encoded H.245 control messages.

Basically, this embodiment of the present invention uses control messages specific to a first type of network or user device in a different context within an intermediate network (i.e. a broadband network) such as to set-up requisite media paths in the intermediate network, whereas the prior art uses a gateway at each boundary to the intermediate network to convert entirely all control messages and media formats for transport across the intermediate network.

Rather than establishing a trunk connection between the LAN and the called subscriber's exchange, a preferred embodiment of the present invention establishes AAL-2 mini-channels.

In relation to the application of the set-up procedure of the preferred embodiment, this set-up procedure is equally applicable, for example, to situations where AAL-5 is used instead of AAL-2, or to where a mixture of AAL-1, AAL-5 and AAL-2 are used instead of just AAL-2. It will be appreciated that the various ATM adaptation layers are geared towards optimal transport of different types of information and that, as such, AAL-2 is more efficient in relation to voice communication as compared with AAL-5 that is optimal for long data messages. Again, the call supervisor 316 is under the impression that it has set-up a call between the NAS 312 and the next exchange 318, although in practice the call supervisor has, in fact, delegated the set-up to the connection supervisor which actually merely sets up the H.245 control channel. This H.245 control channel could be an AAL-5 virtual channel, an AAL-2 sub-channel within a virtual channel, or a functional equivalent. The H.245 control channel is now used to set-up the actual paths for the audio, video or data communication. These actual audio, video or data paths can use either AAL-1, AAL-2 or AAL-5. In other respects, the call set-up procedure is unaltered at a functional level, although minor and readily appreciated changes will be required to the hardware within, for example, the NAS 312.

In a preferred embodiment, the present invention therefore advantageously provides a mechanism for interconnecting a user device to a broadband/mini-channel network, while ostensibly maintaining conventional H.323 calls across the system.

In summary, the embodiment of the invention described with reference to FIGS. 12 to 18 provide a number of advantageous features which may be incorporated in or combined with the features of the invention described with reference to FIG. 1 to 11. These embodiment are summarised in the following paragraphs.

One preferred embodiment provides a method of connecting a first network to a second network via an intermediate network, the first network and second network using a set of control messages to control media paths between the first network and the second network, the method comprising the steps of:

establishing a control channel across the intermediate network to carry the set of control messages;

intercepting the set of control messages in the intermediate network and determining a requirement for media paths in response thereto;

in response to the determination, setting up media paths in the intermediate network to connect paths to carry media traffic between the first network and the second network.

In the embodiment, the set of control messages are preferably communicated on an end-to-end basis, the media paths advantageously carry at least one of audio traffic, video traffic and data traffic, the step of intercepting the control messages preferably further includes the step of identifying the type of communication required in the media paths, and the intermediate network is advantageously a broadband network. Further, the control channel and the media paths preferably use AAL-5, and the control messages are preferably H.245 control messages. Advantageously, the intermediate network contains a call supervisor which is coupled to a connection handler and is responsive to a calling party and the method further comprises the steps of:

having the calling party dial a number of a called party ;

analysing the number of the called party in the call supervisor and selecting an out-going route to the second device based on the number of the called party; and having the call supervisor (116) instruct (206) the connection handler to set-up a control channel.

The connection handler may then indicate to the call supervisor that the control channel is set-up between a NAS and the second network, using a control channel which may be a virtual path using one of AAL-2 and AAL-5.

A further preferred embodiment provides a method of connecting communication traffic comprised of a plurality traffic components across a broadband network from a device such as a local area network, the method comprising the steps of:

in the device, generating control messages for controlling the traffic components and applying these control messages to an interface of the broadband network;

establishing a communication path within the broadband network to carry at least one of the plurality of traffic components; and in the broadband network, using the control messages to control transfer of the plurality of traffic components over the communication path, which is preferably a virtual channel.

In the embodiment, the virtual channel advantageously comprises a plurality of mini-channels and wherein the control messages are enveloped within at least one mini-channel. The embodiment may also advantageously comprise the step of: at the interface, receiving a device address and translating the device address into the broadband network address, and optionally may advantageously include the step of: in relation to a point-to multipoint call having a plurality of destination addresses, consolidating traffic components for each of the plurality of destination addresses into a mini-channel.

Another preferred embodiment relates to a method of interconnecting communication traffic across a broadband network from a local, area network (LAN), the broadband network having a transfer protocol that supports mini-channels in a virtual circuit-switched environment, the LAN providing the communication traffic as LAN streams to an interface of the broadband network, the method comprising the step of mapping the LAN streams to the mini-channels. The LAN streams optionally include audio, video, data and control streams, in which case the method further comprises the step of interpreting the control streams to set-up mini-channels used to carry at least one of an audio, video and a data communication.

A further preferred embodiment relates to a connection handler for orchestrating the communication of traffic components between first and second devices via an intermediate network, the connection handler being responsive to control messages communicated between the first and second devices, and including:

means for setting-up a communication path for carrying the control messages across the intermediate network;

means for determining types of control message sent across the communication path; and means for establishing media paths dependent upon types of control message sent across the communication path, the media paths arranged to transfer the traffic components across the intermediate network.

A further preferred-embodiment provides a communication node having a NAS that provides an interface to a first end-point in a network, the first end-point arranged to initiate a call through the communication node by sending to the NAS a called-party number of a second end-point coupled to an exchange and wherein control messages are communicated between the first end-point and the second end-point, the communication node further comprising:

a call supervisor coupled to the NAS and responsive to the called-party number, the call supervisor arranged to select a route to the exchange; and a connection handler, coupled to the call supervisor and operationally responsive thereto, the connection handler having:

i) means to set-up a control channel that supports transfer of the control messages between the NAS and the exchange in response to the call supervisor receiving the called-party number;

ii) means for determining types of control message sent across the control channel; and iii) means for establishing media paths between the NAS and the exchange dependent upon types of control message sent across the control channel, the media paths arranged to transfer traffic components across the communication node.

In this embodiment, the communication node may be a broadband network and the control channel and the media paths may be virtual channels, the control messages may be H.245 control messages, and the media paths may use one of AAL-1, AAL-2 and AAL-5.

What is claimed is:

1. A method for carrying communications traffic between first and second devices of the same or different types, the first device being coupled to a service provider, the second device being coupled to an exchange distant from the service provider, and the service provider and exchange being coupled for communication across an intermediate network, comprising the steps of:

receiving at the service provider a call signal from the first device, the call signal containing an address of the second device;

setting up a preliminary communications link between the service provider and the exchange to exchange information as to the capabilities of the first and second devices, the information exchanged on the preliminary link including at least one of a communications standard, a desired data rate and a type of data for transmission by the first terminal and, in reply, associated reception capabilities of the second terminal as a subset of the capabilities of the first terminal;

using the information at the service provider to determine a procedure for converting, if necessary, traffic for transmission between the first and second devices; and, setting up a call to transmit the traffic between the first and second devices, converting the traffic as necessary.

2. A method according to claim 1, in which the exchange is a second service provider.

3. A method according to claim 1, in which the service provider determines information as to the at least one of communications protocol, desired data rate and the type of data for transmission by the first terminal by inspecting the call signal and traffic received by the service provider from the first device.

4. A method according to claim 1, in which traffic from and to the first device can be converted between different communications protocols by the service provider.

5. A method according to claim 1, in which the first device is one of a plurality of devices of the same or different types coupled to the service provider for communicating with each other via the service provider and, if present, via the network.

6. A method according to claim 1, in which the procedure for converting traffic, if necessary, is determined so that traffic conversion is only carried out once, if possible, during transmission of traffic from the first device to the second device.

7. A method according to claim 1, in which the procedure for converting the traffic, if necessary, for transmission between the first and second devices is selected so as to minimise the conversion required.

8. A method according to claim 1, in which traffic can be transmitted across the network using any of a plurality of protocols, and in which the procedure for converting the traffic, if necessary, for transmission between the first and second devices is selected so as to minimise the conversion required.

9. A method according to claim 8, in which one of the plurality of protocols is a preferred protocol for traffic transmission across the network and in which the procedure for converting traffic, if necessary, is determined so as to maximise the, use of the preferred protocol or protocols compatible therewith on the network so that, if traffic transmission from the first device to the second device involves conversion into the preferred protocol or a compatible protocol, then the conversion is performed by the service provider before transmission on the network and, if transmission from the first device to the second device involves conversion from the preferred protocol or a compatible protocol into a less-preferred protocol, then the conversion is performed after transmission across the network and before reception by the second device.

10. A method according to claim 1, using a set of control messages to control media paths across the intermediate network between the first and second devices, comprising the step of;

establishing a control channel across the intermediate network to carry the set of control messages;

intercepting the control messages in the service provider and determining a requirement for media paths in response thereto; and in response to the determination setting up a media path or paths in the intermediate network for carrying traffic between the first and second devices.

11. A method according to claim 1, comprising carrying a plurality of traffic components across the network from the first device, the method comprising the steps of:

in the first device, generating control messages for controlling the traffic components and applying these control messages to the service provider;

establishing a communication path within the network to carry at least one of the plurality of traffic components; and in the network, using the control messages to control transfer of the plurality of traffic components over the communication path.

12. A method according to claim 1, in which the intermediate network has a transfer protocol that supports mini-channels in a virtual-circuit-switched environment, the first device providing the communication traffic as traffic streams to the service provider and the method comprising the step of mapping the streams to the mini-channels.

13. A method according to claim 1 in which the traffic comprises at least one of audio, video and data signals and multimedia traffic.

14. A method according to any claim 1 in which the first device comprises any of an SS7 signalling device, an H323 terminal, an H324 terminal, an H320 terminal, an H310 terminal, an H321 terminal, a telephone or a PBX, and in which the first device is coupled to the service provider via any of a LAN, a modem, and an ISDN line.

15. A method for operating a service provider as defined in claim 1.

16. A computer-readable storage medium having a program recorded thereon, where the program is to make a computer implement a method as defined in claim 1.

17. A communications apparatus forming a service provider for establishing communication between a first device coupled to the service provider and a second device coupled to an exchange distant from the service provider, the service provider and the exchange being coupled for communication across an intermediate network; the apparatus comprising;

a network access server coupled to the first device;

a traffic supervisor responsive to a call signal received by the server from the first device for setting up a call between the first and second devices by setting up a preliminary communications link between the service provider and the exchange to exchange information as to the capabilities of the first and second devices and using the information at the service provider to determine a procedure for converting, if necessary, traffic for transmission between the first and second devices, and then establishing a media path across the network between the first and second devices;

a traffic means controlled by the traffic supervisor for transferring the traffic between the first and second devices across the media path, and converting the traffic, if necessary, according to the determined procedure;

wherein the traffic is carried by ATM across the network and the traffic means comprises an ATM virtual-channel switch.

18. A communications apparatus according to claim 17, in which the traffic supervisor comprises a call supervisor, a media handler and a connection handler, and in which;

the call supervisor responds to the call signals from the first device to identify an address for the second device;

the media handler determines the type of the first device and the type of traffic to be communicated to the second device by inspecting signals received from the first device via the server, controls the exchange of information with the second device, and determines the procedure for converting the traffic, if necessary; and the connection handler controls the operation of the traffic means.

19. A communications apparatus according to claim 17, in which the network access server translates control information from the first device into a predetermined protocol for input to the traffic supervisor.

20. A communications apparatus according to claim 19, in which the predetermined protocol is an H323 standard.

21. A communications apparatus according to claim 17, in which the traffic supervisor controls the network access server to convert the traffic to and/or from the first device, if necessary.

22. A communications apparatus according to claim 17, in which the network access server can convert traffic to and/or from the protocol used by the first device from and/or to any of a plurality of protocols compatible with other devices with which the first device may communicate.

23. A communications apparatus according to claim 17, comprising a plurality of network access servers for coupling to a plurality of devices of the same or different types, each network access server being compatible with the type of device to which it is coupled.

24. A communications apparatus according to claim 17, comprising a network access server having a plurality of ports for coupling to a plurality of devices of the same or different types, the network access server being able to identify traffic from each device type and to convert traffic to and/or from the standard used by each device type from and/or to any of a plurality of standards compatible with other devices for communication.

25. A communications apparatus according to claim 17, in which the traffic supervisor determines the procedure for converting the traffic, if necessary, so as to increase the efficiency of communication between the first and second devices.

26. A communications apparatus according to claim 17, in which the traffic supervisor orchestrates the communication of traffic components between first and second devices via the intermediate network, the traffic supervisor being responsive to control messages communicated between the first and second devices, and the traffic supervisor including;

means for setting up a communication path for carrying the control messages across the intermediate network;

means for determining types of control message sent across the communication path; and means for establishing media paths dependent upon types of control message sent across the communication path, the media paths arranged to transfer the traffic components across the intermediate network.

27. A service provider as defined in claim 17.

28. A communications system comprising a service provider as defined in claim 17.

29. A computer-readable storage medium having a program recorded thereon, where the program is to make a computer implement a method for carrying communications traffic between first and second devices of the same or different types, the first device being coupled to a service provider, the second device being coupled to an exchange distant from the service provider, and the service provider and exchange being coupled for communication across an intermediate network, comprising the steps of:

receiving at the service provider a call signal from the first device, the call signal containing an address of the second device;

setting up a preliminary communications link between the service provider and the exchange to exchange information as to the capabilities of the first and second devices; the information exchanged on the preliminary link including at least one of a communications standard, a desired data rate and a type of data for transmission by the first terminal and, in reply, associated reception capabilities of the second terminal as a subset of the capabilities of the first terminal;

using the information at the service provider to determine a procedure for converting, if necessary, traffic for transmission between the first and second devices; and, setting up a call to transmit the traffic between the first and second devices, converting the traffic as necessary.

30. A method for carrying communications traffic between first and second devices of the same or different types, the first device being coupled to a service provider, the second device being coupled to an exchange distant from the service provider, and the service provider and exchange being coupled for communication across an intermediate network, comprising the steps of;

receiving at the service provider a call signal from the first device, the call signal containing an address of the second device, the service provider determining information as to the at least one of a communications protocol, a desired data rate and a type of transmission by the first terminal by inspecting the call signal and traffic received by the service provider from the first device;

setting up a preliminary communications link between the service provider and the exchange to exchange information as to the capabilities of the first and second devices;

using the information at the service provider to determine a procedure for converting, if necessary, traffic for transmission between the first and second devices; and, setting up a call to transmit the traffic between the first and second devices, converting the traffic as necessary.

* * * * *